US010637058B2

(12) United States Patent
Spahr et al.

(10) Patent No.: US 10,637,058 B2
(45) Date of Patent: Apr. 28, 2020

(54) CARBONACEOUS COMPOSITE MATERIALS WITH SNOWBALL-LIKE MORPHOLOGY

(71) Applicant: ImerTech SAS, Paris (FR)

(72) Inventors: Michael Spahr, Bellinozona (CH);
Pirmin Ulmann, Giubiasco (CH);
Simone Zürcher, Origlio (CH); Sergio Pacheco Benito, Biasca (CH);
Hiroyuki Taki, Tokyo (JP)

(73) Assignee: ImerTech SAS, Paris (FR)

( * ) Notice: Subject to any disclaimer, the term of this patent is extended or adjusted under 35 U.S.C. 154(b) by 0 days.

(21) Appl. No.: 15/735,970

(22) PCT Filed: Oct. 21, 2016

(86) PCT No.: PCT/EP2016/075423
§ 371 (c)(1),
(2) Date: Dec. 13, 2017

(87) PCT Pub. No.: WO2017/068147
PCT Pub. Date: Apr. 27, 2017

(65) Prior Publication Data
US 2018/0183060 A1    Jun. 28, 2018

Related U.S. Application Data

(60) Provisional application No. 62/244,556, filed on Oct. 21, 2015.

(30) Foreign Application Priority Data

Oct. 21, 2015   (EP) .................................... 15190921

(51) Int. Cl.
*H01M 4/587*   (2010.01)
*H01M 10/0525*   (2010.01)
(Continued)

(52) U.S. Cl.
CPC ............. *H01M 4/587* (2013.01); *C01B 32/00* (2017.08); *C01B 32/05* (2017.08); *C01B 32/205* (2017.08);
(Continued)

(58) Field of Classification Search
CPC ...... H01B 1/24; H01M 31/587; H01M 4/366; C01B 31/04
(Continued)

(56) References Cited

U.S. PATENT DOCUMENTS

2013/0260150 A1* 10/2013 Grivei ...................... H01B 1/24
428/402
2014/0065488 A1   3/2014 Lee et al.
(Continued)

FOREIGN PATENT DOCUMENTS

JP          205-243508       * 9/2005 ............. C01B 31/04
WO      WO 03/064560 A1      8/2003
WO      WO 2015/158741 A2   10/2015

OTHER PUBLICATIONS

International Search Report and Written Opinion dated Sep. 13, 2016, in International Application No. PCT/EP2016/075423 (22 pgs.).

*Primary Examiner* — Khanh T Nguyen
(74) *Attorney, Agent, or Firm* — Finnegan, Henderson, Farabow, Garrett & Dunner, LLP

(57) ABSTRACT

The present disclosure relates to a novel process for preparing isotropic carbonaceous composite particles with favorable crystallographic, morphological & mechanical properties, wherein relatively fine carbonaceous primary particles are coated with a carbonaceous binder precursor material, agglomerated and finally heat-treated at temperatures of between about 1850 and 3500° C. to convert the binder precursor material to non-graphitic or graphitic carbon, thereby resulting in stable highly isotropic carbonaceous (Continued)

Scanning electron microscopy (SEM) images of graphitic carbon powder 4 composite materials wherein the primary particles of the aggregate are held together by the carbonized/graphitized binder. The present disclosure also relates to the isotropic carbonaceous composite particles obtainable by the process described herein. The disclosure further relates to uses of said isotropic carbonaceous composite material in various applications, including as active material in negative electrodes in lithium-ion batteries, and in secondary products containing said isotropic carbonaceous composite material.

20 Claims, 8 Drawing Sheets

(51) Int. Cl.
| | |
|---|---|
| *H01M 10/054* | (2010.01) |
| *H01M 10/44* | (2006.01) |
| *H01M 4/36* | (2006.01) |
| *C01B 32/00* | (2017.01) |
| *H01M 2/00* | (2006.01) |
| *C01B 32/205* | (2017.01) |
| *C01B 32/05* | (2017.01) |
| *H01M 4/02* | (2006.01) |

(52) U.S. Cl.
CPC ............ *H01M 2/00* (2013.01); *H01M 4/364* (2013.01); *H01M 4/366* (2013.01); *H01M 10/054* (2013.01); *H01M 10/0525* (2013.01); *H01M 10/446* (2013.01); *C01P 2004/51* (2013.01); *C01P 2006/12* (2013.01); *H01M 2004/027* (2013.01); *H01M 2220/20* (2013.01); *Y02E 60/122* (2013.01); *Y02P 70/54* (2015.11); *Y02T 10/7011* (2013.01)

(58) Field of Classification Search
USPC ........................................ 428/402; 429/231.4
See application file for complete search history.

(56) References Cited

U.S. PATENT DOCUMENTS

2015/0194668 A1* 7/2015 Ueda ..................... H01M 4/587
                                                      429/231.4
2017/0033360 A1* 2/2017 Michaud ............... H01M 4/366

\* cited by examiner

Figure 1: Scanning electron microscopy (SEM) images of graphitic carbon powder 4
a)
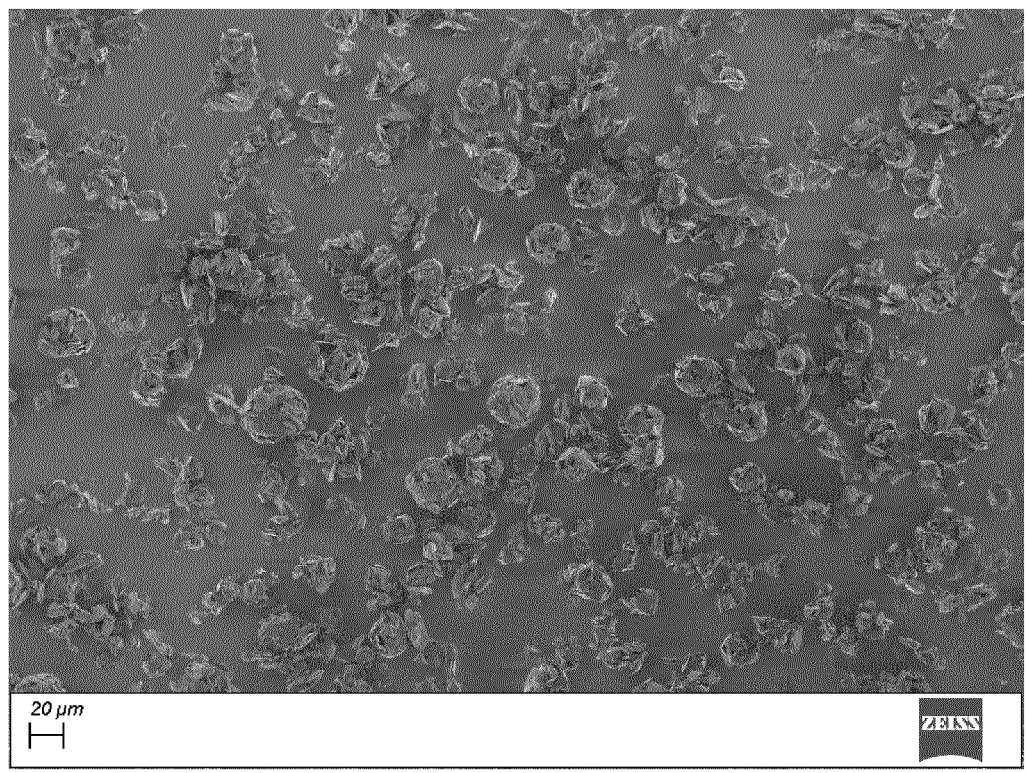
b)
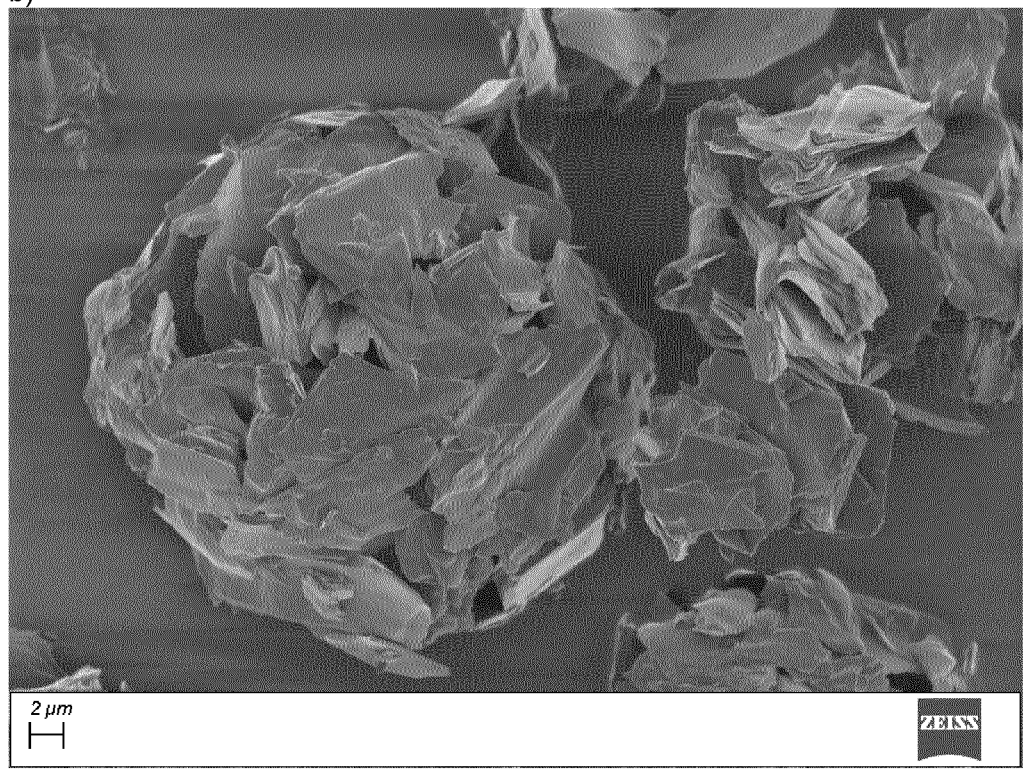

Figure 2: Scanning electron microscopy (SEM) images of carbon intermediate 5 exhibiting non-crystalline binder droplets on the surface
a)
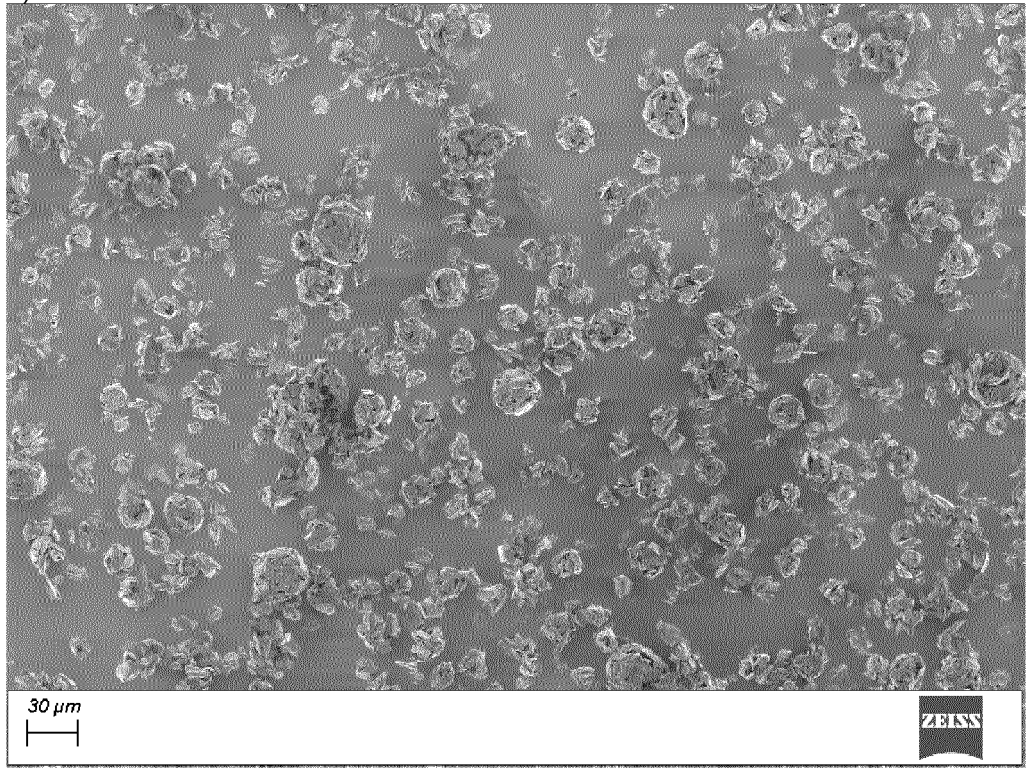
b)
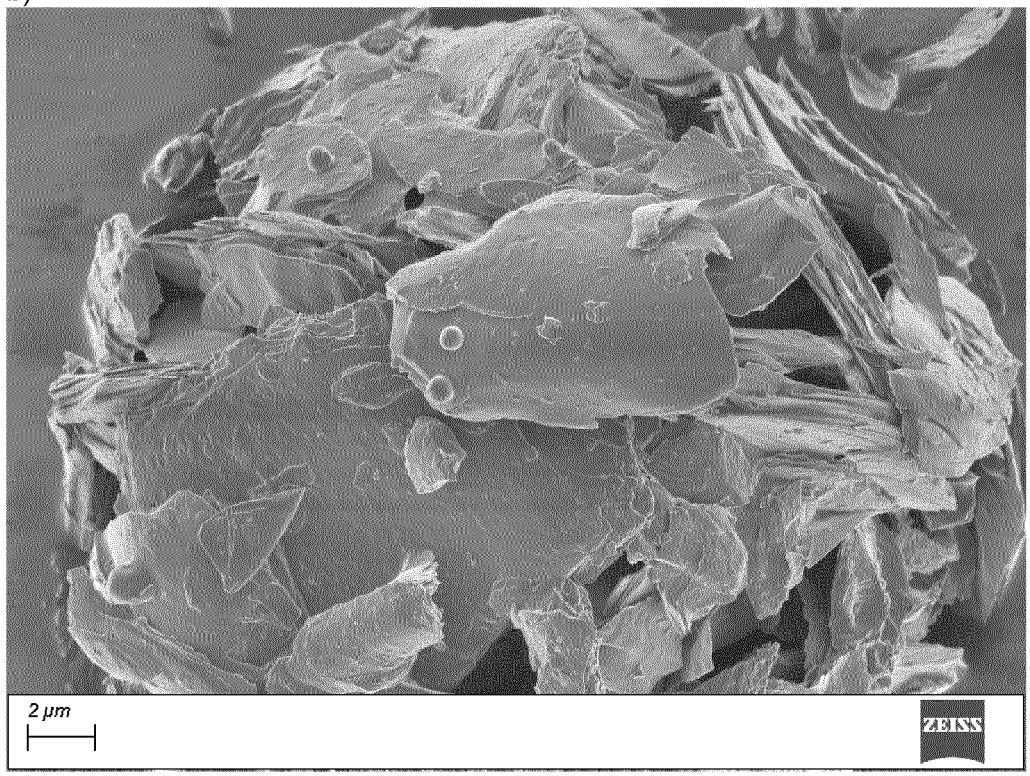

Figure 3: Scanning electron microscopy (SEM) images of graphitic carbon powder 6
a)
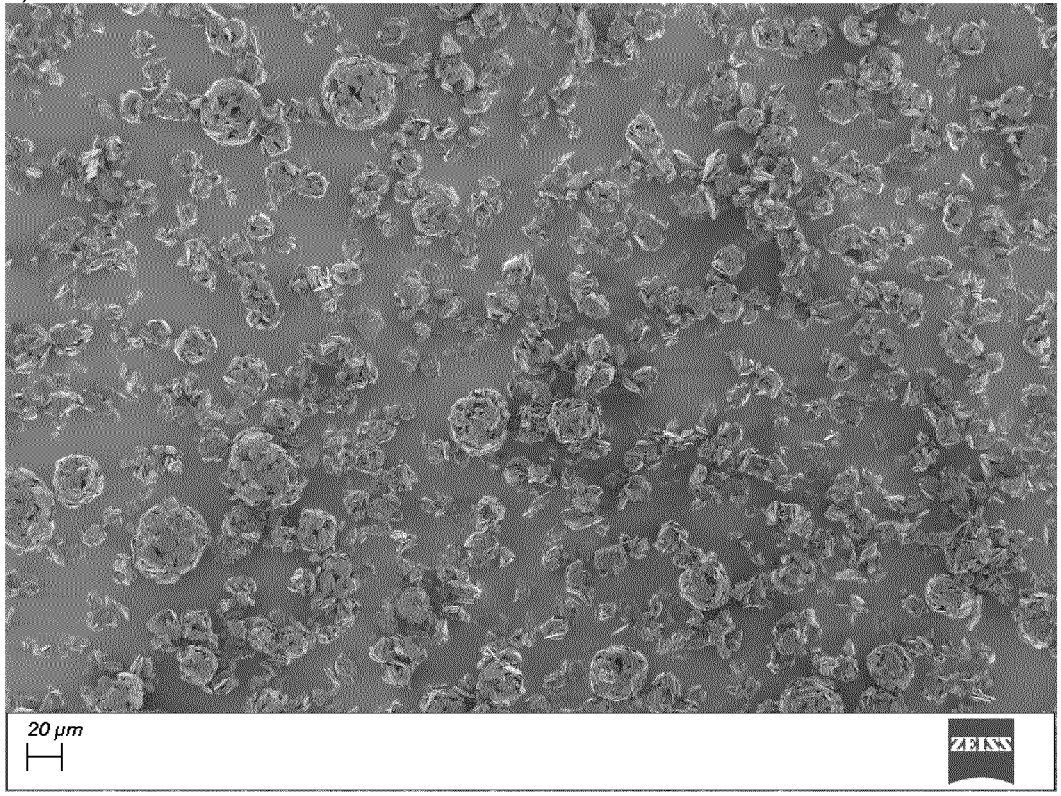
b)
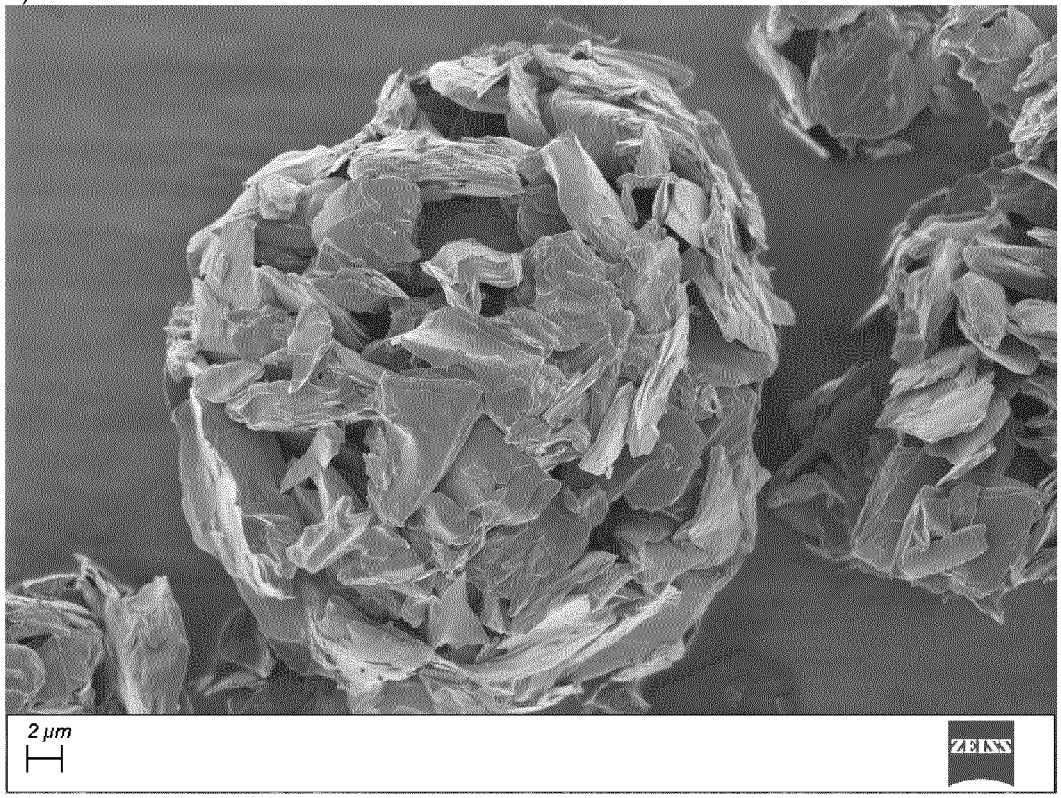

Figure 4: Scanning electron microscopy (SEM) images of carbon powder 7
a)
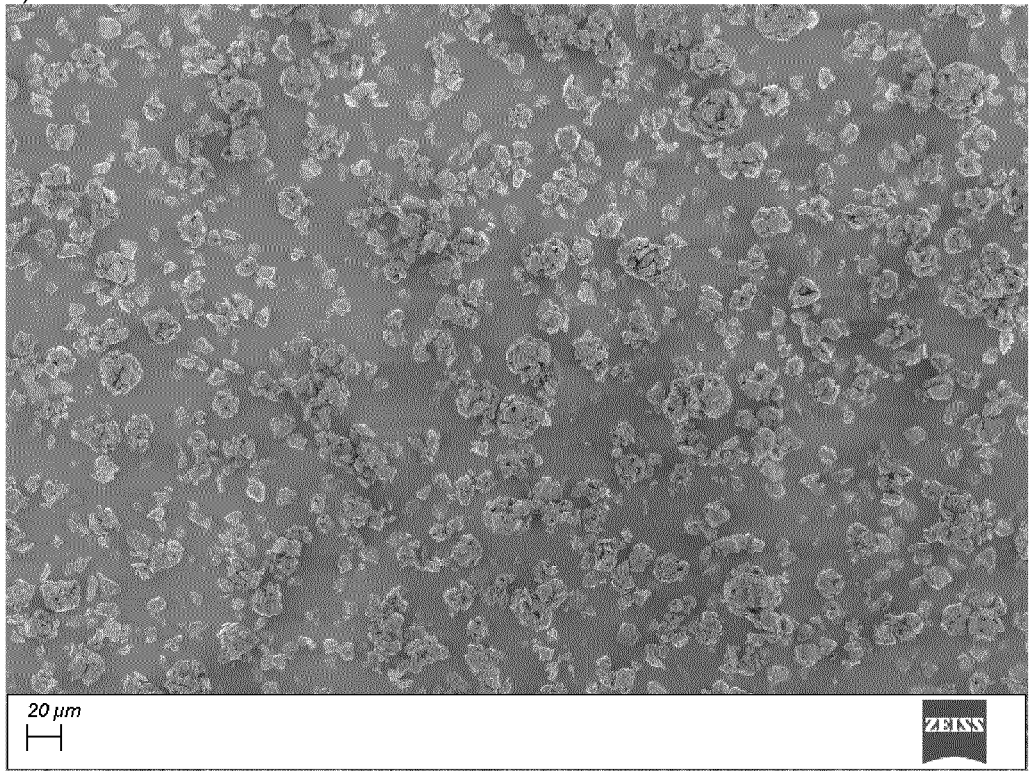
b)
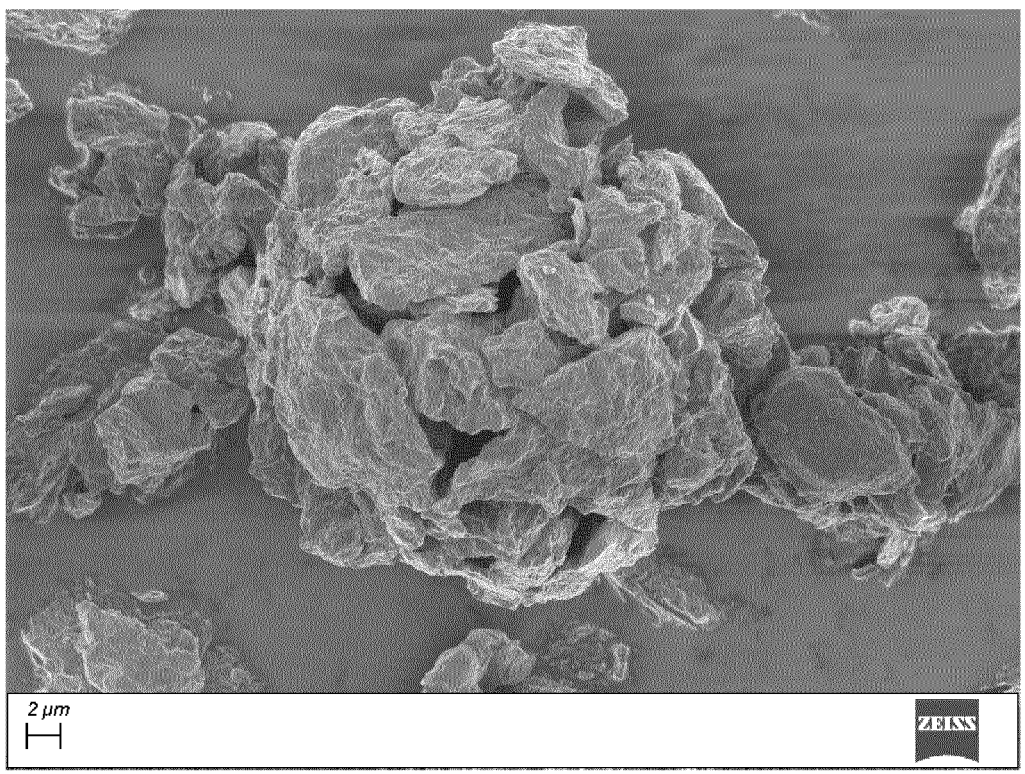

Figure 5: Scanning electron microscopy (SEM) images of cross-sections of electrodes containing the carbon mixture 13 (unpressed).
a)
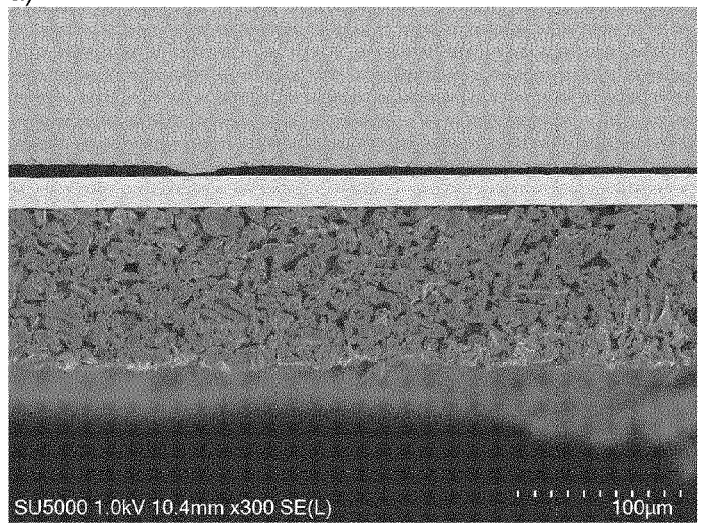
b)
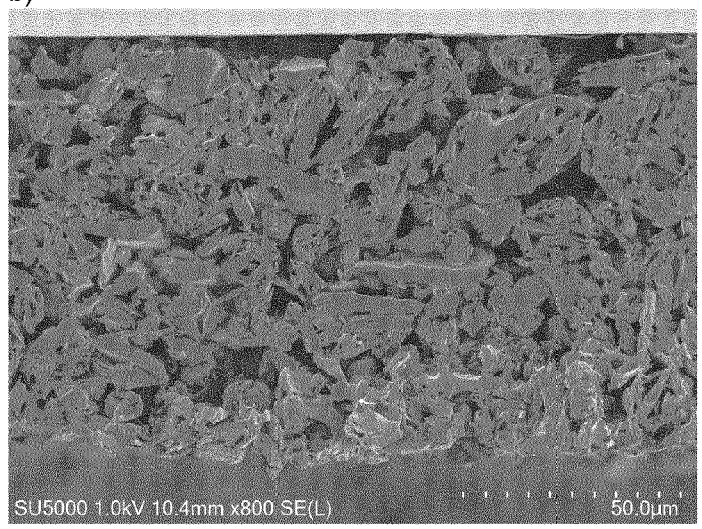
c)
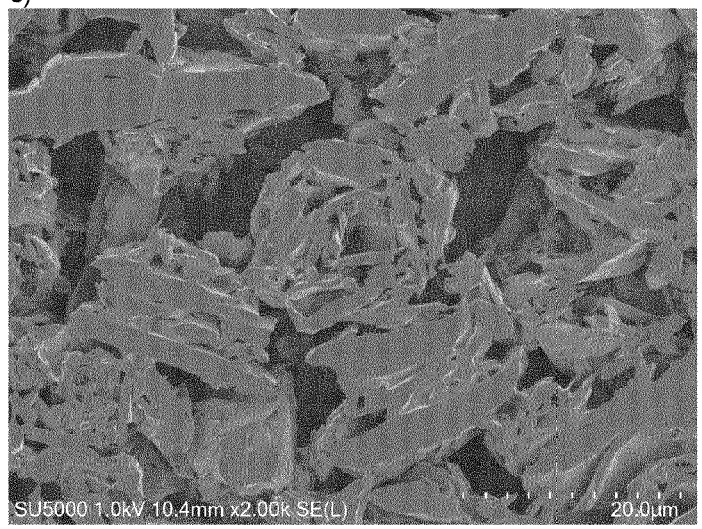

Figure 6: Scanning electron microscopy (SEM) images of cross-sections of electrodes containing carbon mixture 13, pressed to an electrode density of 1.7 g/cm$^3$.
a)
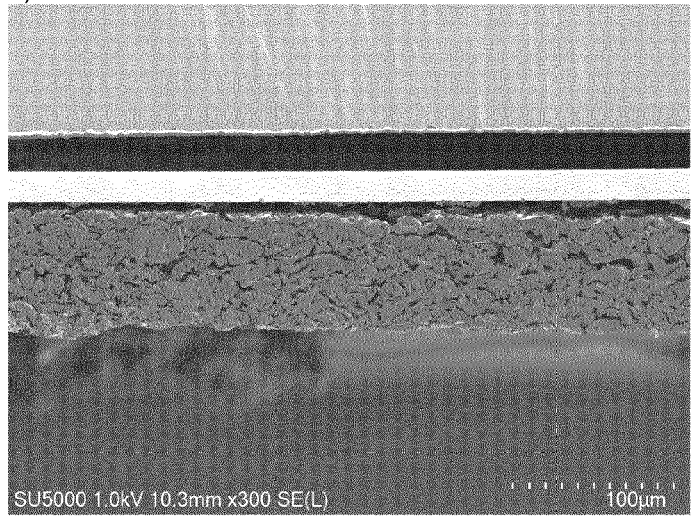
b)
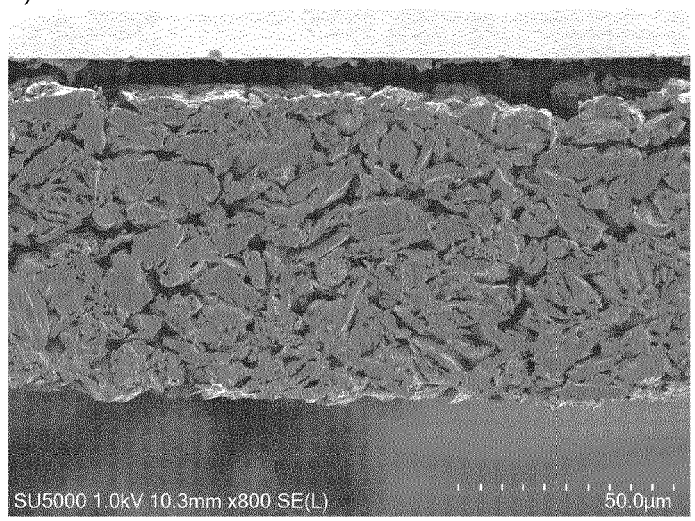
c)
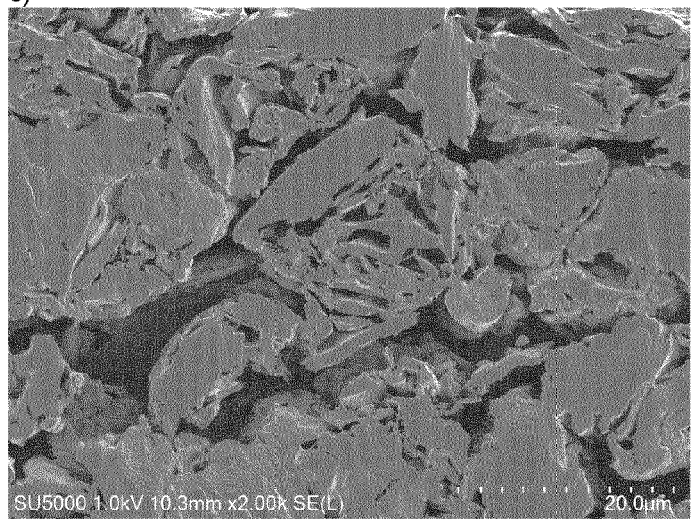

Figure 7: Log differential intrusion vs. pore size measured by mercury porosimetry.
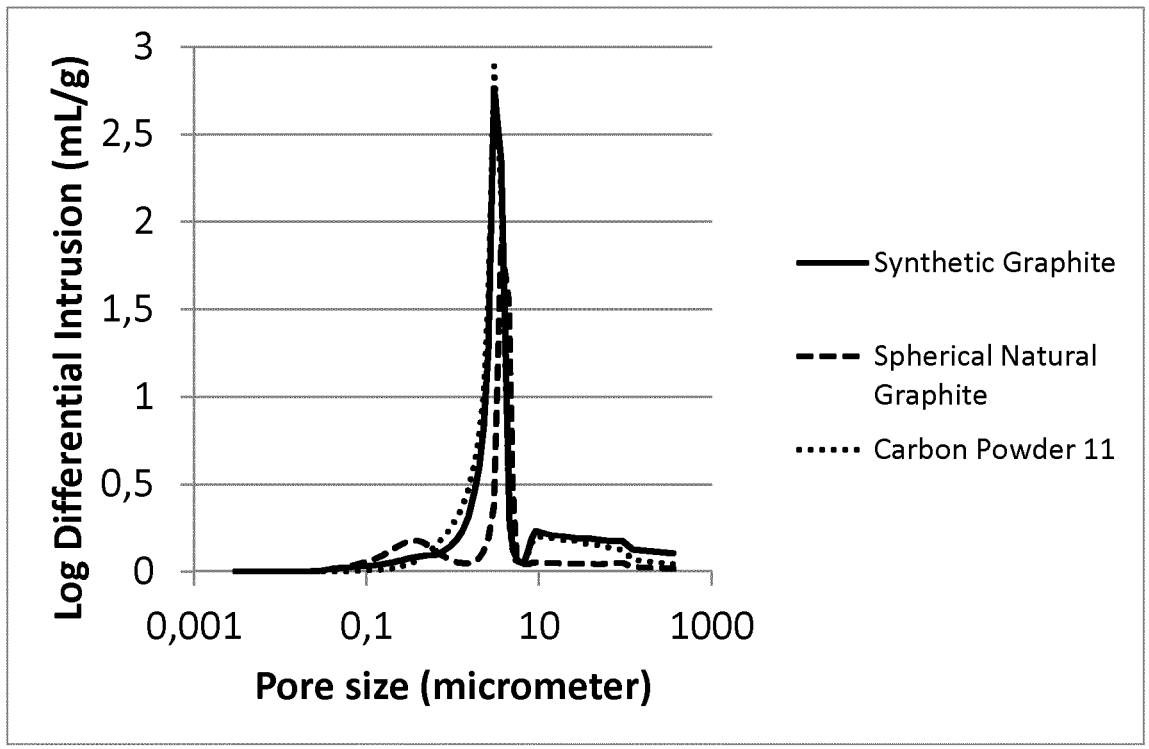
Figure 8: Cumulative intrusion vs. pore size measured by mercury porosimetry
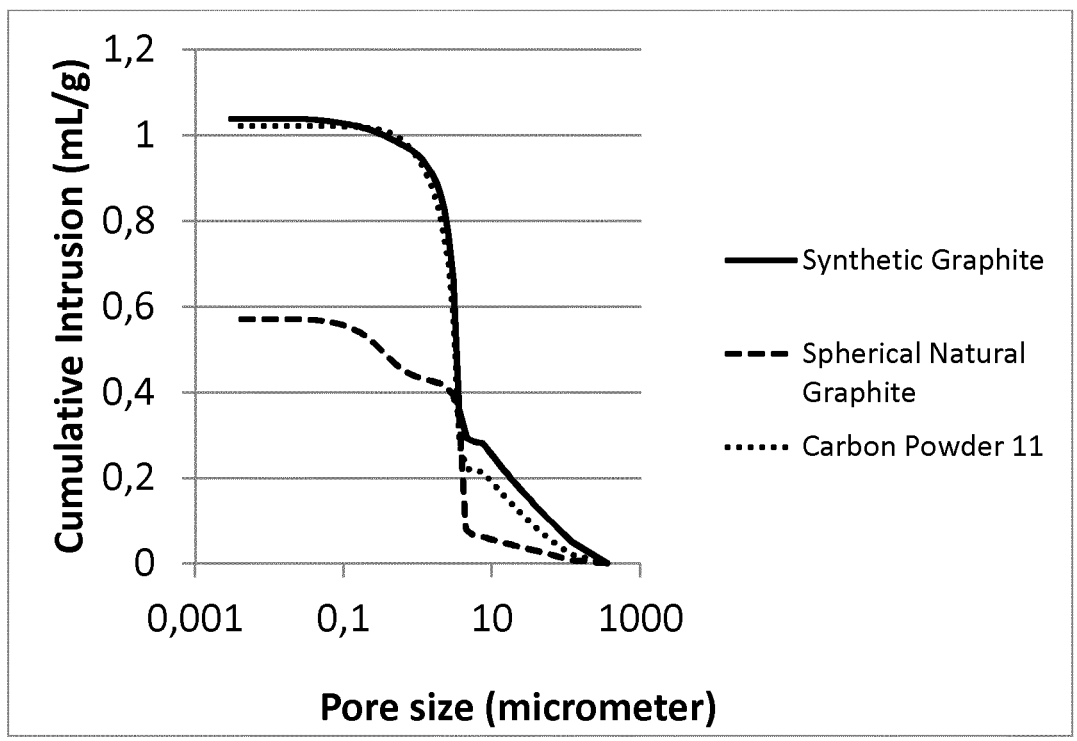

Figure 9: Incremental pore volume vs. pressure measured by mercury porosimetry
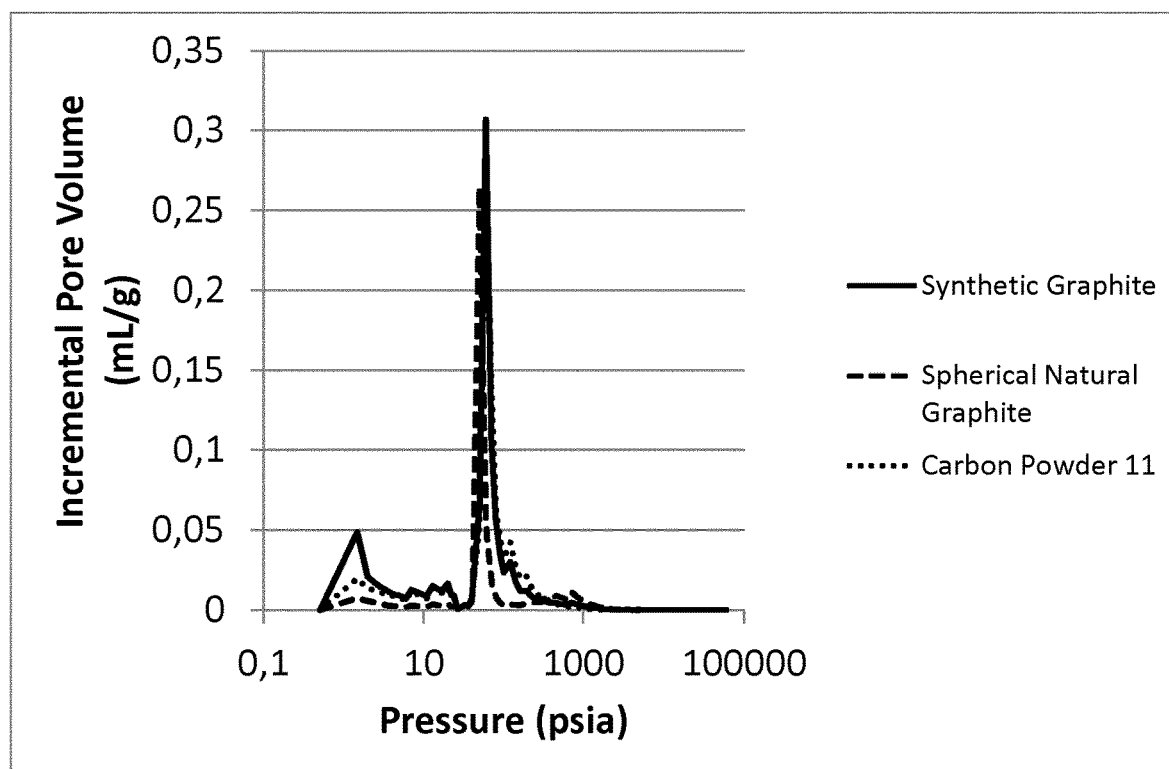

CARBONACEOUS COMPOSITE MATERIALS WITH SNOWBALL-LIKE MORPHOLOGY

CLAIM FOR PRIORITY

This application is a U.S. national phase entry under 35 U.S.C. § 371 from PCT International Application No. PCT/EP2016/075423, filed Oct. 21, 2016, which claims the benefit of priority of EP Application No. 15190921.5, filed Oct. 21, 2015, and U.S. Provisional Application No. 62/244,556, filed Oct. 21, 2015, to all of which this application claims priority and all of which are incorporated herein by reference.

FIELD OF THE DISCLOSURE

The present disclosure relates to a novel process for preparing isotropic carbonaceous composite particles with favorable crystallographic and morphological properties, as well as to the isotropic carbonaceous composite particles obtainable by said process. The disclosure also relates to the uses of said isotropic carbonaceous composite material in various applications, including as active material in negative electrodes of lithium-ion batteries, and other products containing said isotropic carbonaceous composite material.

BACKGROUND OF THE DISCLOSURE

Lithium-ion batteries are widely used in portable consumer devices like portable computers, mobile phones, and video or photographic cameras. In addition, large-scale lithium batteries are an attractive battery technology for hybrid electric vehicles, plug-in electric vehicles, and fully electric vehicles that will have a growing future market share due to their improved fuel economy and lowered $CO_2$ gas emission. The growing importance of renewable energy production requires large energy storage systems and large-scale lithium-ion batteries are considered as potential battery systems used in smart grids to compensate peak power consumption in houses or to store the energy produced in off-grid photovoltaic systems.

Graphite is used as the electrochemically active material in the negative electrode of lithium-ion batteries. The graphite crystallinity is required to obtain high reversible specific charges (reversible electrochemical capacity) up to a theoretical value of 372 Ah/kg of graphite. The electrochemical redox process generating the energy is based on the reversible electrochemical intercalation of lithium into the graphite structure. The theoretical reversible capacity corresponds to a stoichiometry of $LiC_6$ of the stage-1 lithium-graphite intercalation compound formed in this intercalation process. During the charging process of the lithium-ion cell, lithium ions from the positive electrode containing materials such as $LiCo_xNi_yMn_zO_2$ where x+y+z=1 and having a layered structure, the $LiMn_2O_4$ with spinel structure, or $LiFePO_4$ of olivine-type migrate through the electrolyte and are intercalated in the graphite negative electrode. During the discharge process, the lithium ions are deintercalated from the graphite and inserted in the structure of the positive electrode material.

Details about the lithium-ion battery technology and carbonaceous negative electrode materials are described in several reviews and monographs (see for example: P. Novak, D. Goers, M. E. Spahr, "Carbon Materials in Lithium-Ion Batteries", in: Carbons for Electrochemical Energy Storage and Conversion Systems, F. Béguin, E. Frackowiak (Eds.), Chapter 7, p. 263-328, CRC Press, Boca Raton Fl, USA, 2010; Lithium-Ion Batteries-Science and Technologies, M. Yoshio, R. J. Brodd, A. Kozawa (Eds.), Springer, New York, N.Y., 2009; Lithium Batteries-Science and Technology, G.-A. Nazri, G. Pistoia (Eds.), Kluwer Academic Publishers, Norwell, Mass., USA, 2004; Carbon Anodes for Lithium-Ion Batteries, in: New Carbon Based Materials for Electrochemical Energy Storage Systems, I. Barsukov, C. S. Johnson, J. E. Doninger, W. Z. Barsukov (Eds.), Chapter 3, Springer, Dordrecht, The Netherlands, 2006).

Similarly, isotropic carbon materials are also advantageous for graphite bipolar plates in PEM fuel cells. Bipolar plates in fuel cells are normally plagued by the low through-plane conductivity when flaky additives are used. A material with a higher isotropy improves the through-plane conductivity of the bipolar plate.

Furthermore, isotropic carbon materials are beneficial in current collector coatings for various battery systems in order to achieve a high through-plane conductivity.

State of the Art in Graphite Particle Shaping and Coating

The rounding of platelet-like graphite particles can be achieved by special mechanical treatments, typically of natural graphite, in ball mills, hammer mills, or by an autogenous grinding process. Usually, in these processes a large amount of fines or graphite dust is created that has to be separated from the rounded graphite product, causing a significant loss of graphite. In addition, the rounding of particle contours does not significantly change the anisotropic arrangement of the crystallites contained in the particles and introduces strain into the particles that can lead to swelling effects in lithium-ion batteries when this strain is released during cycling.

The coating of the graphite particles by an amorphous carbon layer at present is achieved in the industry mostly by mixing the graphite particles with coal tar pitch either in a mixing process in which the pitch is mixed either as dry powder, molten liquid, or dissolved in an organic solvent. Subsequently the dry graphite/pitch mixture is carbonized and subsequently calcined under inert gas conditions at temperatures around 1500° C. One major problem of this coating process is the impact of coal tar pitch or other pitch types on the environment and health as some of the polyaromatic organic pitch ingredients ("PAHs") are considered highly toxic, carcinogenic, and/or mutagenic. Therefore, coal tar pitch is considered as a substance of very high concern in the European REACH regulation and requires a controlled use in existing manufacturing processes. New permissions for production processes involving coal tar pitch are usually not granted by state authorities in Europe. Newly developed production processes therefore require alternatives to pitch-based coating processes that so far do not appear to exist. Pitch alternatives like special polymers or other solid organic substances that result in high carbon yield during carbonization are significantly more expensive, may not lead to the same quality of carbon coating, or are of environmental or health concern as well.

Graphitized mesocarbon microbeads (MCMB) stands for an artificial graphitic coke with spherical particle shape. When heating coal tar pitch at about 450° C. solid spherical coke particles are formed in the melt. The spherical particles are extracted, oxidized at elevated temperatures in air, carbonized and finally graphitized, resulting in particles with a smooth spherical surface.

Fast charge and discharge performance is of key importance for lithium-ion batteries in several applications. Specifically, automotive lithium-ion batteries used in fully electric vehicles or in plug-in electric vehicles require high capacity graphite-based active materials in the negative electrode. The alignment of the anisotropic graphite platelets along the platelet planes in the electrode and the electrode pore structure is considered to be responsible for the limited lithium-ion diffusion in the porous graphite electrode. The limitations with regard to lithium-ion diffusion and solid state diffusion of lithium are often seen as a reason for the non-ideal performance characteristics of graphite electrodes at high current rates during charge and discharge. The diffusion limitation of such graphite electrodes do not only reduce the cell power and charging speed, but may also cause the plating of metallic lithium at the negative electrode surface during the charging of the cell at high current rates, which is considered as a major safety problem of lithium-ion batteries.

In commercial graphite negative electrode materials based on natural graphite, the platelet-like shape of graphite is often modified to a more spherical or rounded shape. Rounded carbon particle shape is normally achieved by special mechanical treatments. The mechanical treatments abrade the edges thereby rounding the particles and as a consequence increasing the fine fraction in the particle size distribution and creating create many surface defects that can lead to parasitic reactions in lithium-ion batteries. However, these mechanical treatments do not significantly change the anisotropic particle character, i.e. resulting particles may show rounded particle contours, but do not avoid the problems described above.

Isotropic hard carbons have historically been used due to their favorable lithium intercalation/de-intercalation curves for applications in which fast charge and discharge and low temperature performance is important. The reversible capacity of these hard carbons is, however, lower than for graphite.

The importance of an isotropic pore shape and low tortuosity has been demonstrated in positive electrodes, see D. E. Stephenson et al. *J. Electrochem. Soc.* 2011, 158 (7), A781.

Isotropic graphite particles can be made by agglomeration of smaller particles in a random or at least near random orientation. However, a problem with many agglomerated graphite particles is the inherent fragility of the particle morphology since these agglomerates are typically only held together by adhesion (mainly through van der Waals forces), which facilitates the integrity of the coating (if present) and their break-up into smaller particles, thereby resulting in a higher surface area. This instability is particularly relevant for material that undergoes mechanical treatments for example upon pressing the graphite material into a negative electrode of a lithium-ion battery. It is readily apparent that the breakage of assembled particles is problematic, not the least in view of the change of the particle characteristics.

Thus, it would be desirable to produce carbonaceous materials that allow producing electrodes exhibiting on the one hand desirable fast charge and discharge characteristics, high reversible capacity, and/or exhibiting mechanical stability, allowing the particles to maintain their morphology and surface properties, for example during the pressing process for preparing the electrodes.

SUMMARY OF THE DISCLOSURE

The present inventors have developed a novel process to produce highly isotropic carbonaceous particles that do not exhibit the problems observed with assembled graphite materials of the prior art, i.e. they may be characterized by an isotropic morphology and high porosity favorable for fast charge and discharge capability, high reversible capacity and excellent mechanical stability.

Thus, in a first aspect the present disclosure relates to carbonaceous composite particles, wherein said particles are comprised of a multiplicity of aggregated primary particles, and wherein said primary particles are held together by a carbonaceous binder material attached to the surface of the primary particles. These composite particles are further characterized by any one or a combination of the following parameters:

(i) a pressure stability, wherein the BET specific surface area does not increase by more than 3.5 m$^2$/g; and/or by not more than 80% (compared to the BET specific surface area of the particles before pressing) after pressing at 15 kN/cm$^2$ for 10 s;

(ii) a mass loss of non-graphitic carbon according to thermogravimetric analysis of less than 5%, or less than 2%, or less than 1%, or less than 0.5%;

and/or (iii) by having a crystalline surface with a surface crystallinity expressed by an $L_a$ of >4 nm, or >6 nm, or >10 nm, as determined by measuring the $I_D/I_G$ band amplitude ratio via Raman spectroscopy.

Another aspect of the present disclosure relates to compositions comprising the carbonaceous composite particles as defined herein. These compositions may comprise one type of carbonaceous composite particles or may comprise different types of the carbonaceous composite particles as described herein.

Yet another aspect relates to a process for making such carbonaceous composite particles. The process as described herein comprises attaching a carbonaceous binder precursor material to the surface of carbonaceous particles, optionally in the presence of a solvent, thereby forming a coating of the (primary) carbonaceous particles by the carbonaceous binder precursor material. If a solvent was used in this step, the dispersion is dried to remove any solvent. During or after the coating and/or the drying step, the process further comprises causing agglomeration of the coated primary carbonaceous particles. After agglomeration, the dry agglomerated particles are subjected to a high temperature treatment between about 1850 and 3500° C. This heat treatment yields carbonaceous composite particles comprised of a multiplicity of aggregated primary particles, wherein said primary particles are held together by a carbonaceous binder material attached to the surface of the primary particles. In other words, the primary particles are "glued" together by the carbonaceous binder precursor material which is converted to carbon or even graphite during the heat treatment at temperatures above 1850° C. (practically up to 3500° C., though at some point economic considerations prevent a heating above such temperatures).

Yet another aspect relates to the use of the carbonaceous composite particles or the compositions as described herein for preparing a negative electrode material for a lithium-ion battery. Consequently, a negative electrode of a lithium-ion battery comprising the carbonaceous composite particles as described herein as an active material in the negative electrode of the battery is another aspect of the present disclosure, as is a lithium-ion battery comprising said carbonaceous composite particles.

A further aspect relates to an energy storage device, a carbon brush, a polymer composite material comprising the carbonaceous composite particles or the composition comprising said carbonaceous composite particles as described herein.

Yet a further aspect relates to an electric vehicle, hybrid electric vehicle, or plug-in hybrid electric vehicle comprising a lithium-ion battery with favorable fast charge and discharge as well as low temperature performance properties, wherein said lithium-ion battery comprises the carbonaceous composite particles or the composition comprising said carbonaceous composite particles as described herein as an active material in the negative electrode of the battery.

Yet another aspect relates to a sodium-ion battery comprising the carbonaceous composite particles or the composition comprising said carbonaceous composite particles as described herein.

Another aspect of the present disclosure relates to a carbon-based coating exhibiting isotropic electric, mechanical or heat-conducting properties, wherein said coating comprises the carbonaceous composite particles or the composition comprising said carbonaceous composite particles as described herein, as well as to the use of said carbon-based coating as a coating of a current collector in batteries.

A dispersion comprising the carbonaceous composite particles or the composition comprising said carbonaceous composite particles as described herein is another aspect of the present disclosure.

Finally, the present disclosure also relates to a method for making a building block of a negative electrode, employing the carbonaceous composite particles or the composition comprising said carbonaceous composite particles as described herein.

BRIEF DESCRIPTION OF THE FIGURES

FIG. 1, panel a) shows a scanning electron microscope (SEM) image of graphitic carbon powder 4 prepared as described in Example 1. Panel b) is a magnification of a single spherical particle.

FIG. 2, panel a) shows a scanning electron microscope (SEM) image of carbon intermediate 5 prepared as described in Example 2. Panel b) is a magnification of a single spherical particle showing the presence of non-crystalline binder droplets on the surface.

FIG. 3, panel a) shows a scanning electron microscope (SEM) image of a graphitic carbon powder 6 prepared as described in Example 2. Panel b) is a magnification of a single spherical particle.

FIG. 4, panel a) shows a scanning electron microscope (SEM) image of carbon powder 7 prepared as described in Example 3. Panel b) is a magnification of a single spherical particle.

FIG. 5 shows scanning electron microscope (SEM) images of cross-sections of unpressed electrodes containing the active carbon mixture 13, at three different magnifications.

FIG. 6 shows scanning electron microscope (SEM) images of cross-sections of pressed electrodes containing the active carbon mixture 13, at three different magnifications.

FIG. 7 shows the Log differential intrusion against the pore size for synthetic graphite, natural graphite and carbon powder 11 as measured by mercury porosimetry.

FIG. 8 shows the cumulative intrusion against the pore size for synthetic graphite, natural graphite and carbon powder 11 as measured by mercury porosimetry.

FIG. 9 shows the incremental pore volume against the pressure for synthetic graphite, natural graphite and carbon powder 11 as measured by mercury porosimetry.

DETAILED DESCRIPTION OF THE DISCLOSURE

The relevant disclosures in the prior art documents mentioned herein are hereby incorporated by reference in their entirety. All terms used in the present application shall have the meaning usually employed by a relevant person skilled in the art, unless specifically defined otherwise in this disclosure.

A novel multistep-process has been developed by the present inventors which allows the generation of novel highly isotropic carbonaceous (i.e. graphitic or non-graphitic) composite particles that may exhibit excellent mechanical and electrochemical properties. More specifically, the process is suitable to produce highly spherical particles with a large content of electrolyte-accessible pores or channels (i.e., high electrolyte diffusion capacity) in combination with relatively high xylene densities (such as above 2.20 $g/cm^3$). This morphology is beneficial for producing electrodes exhibiting favorable lithium diffusion and electrochemical capacities, leading to cells with high energy, power density and charging speed.

These advantageous properties render the novel carbonaceous composite particles very useful as an active material of negative electrodes in lithium-ion batteries, particularly for applications where fast charge and discharge as well as low temperature performance is required. For example, automotive lithium-ion batteries used in fully electric vehicles or in plug-in electric vehicles require high capacity graphite-based active materials in the negative electrode that allow the manufacture of electrodes with electrolyte filled channels exhibiting low tortuosity, allowing the lithium-ions to diffuse isotropically despite the fundamentally anisotropic structure of graphite, resulting, inter alia, in favorable charge/discharge and favorable low temperature performance.

The novel multi-step process allows the "bottom-up" construction of highly isotropic composite particles having the desired electrochemical as well as mechanical properties, wherein the composite particles are constructed from agglomerated finer primary particles that have been coated with a carbonaceous binder material which upon carbonization at higher temperatures (typically between 1850 and 3500° C.) is converted to graphitic or non-graphitic material stably connecting the multiplicity of fine particles resulting in a characteristic spherical porous shape resembling a "snowball-like", framboidal or "rose bud-like" morphology (see FIGS. 1 to 4 for details).

Such composite particles differ from merely agglomerated graphite particles in that they exhibit an increased mechanical stability due to the connection of the primary particles through the carbonized binder material acting as a "glue", thereby stably holding together the finer particles in a random orientation. Some embodiments of the carbonaceous composite materials described herein are unique in view of the random or near-random orientation of the finer primary particles and the presence of isotropically distributed pores within the composite particles, combined with an excellent mechanical stability, allowing the particles to withstand any significant damage/breakdown during the electrode manufacturing process.

The above-described morphology of the aggregated and optionally coated single particles in the composite particle allows access of the electrolyte through large pores, favoring the lithium diffusion in the solid because the diffusion paths in the solid are reduced to the size of the primary particles of the aggregated particles. This is different to typical amorphous carbon-coated spherical graphite particles where, for example in the case of a pitch coating process, the amorphous carbon coating will be present at the particle surface, thus also potentially blocking/closing the pores of the agglomerated carbonaceous particles. The lack of electrolyte-accessible pores will increase the path for the lithium diffusion to the dimension of the particle, thus no longer allowing the direct wetting with the liquid electrolyte.

Carbonaceous Composite Particles

Thus, a first aspect of the present disclosure relates to carbonaceous composite particles, wherein said composite particles are comprised of a multiplicity of aggregated primary particles, wherein said primary particles are held together by a carbonaceous binder material attached to the surface of the primary particles. These composite particles are further characterized by any one or a combination of the following parameters:

(i) a good pressure stability, wherein the BET specific surface area (BET SSA) does not increase by more than 3.5 $m^2/g$, or more than 3.0 $m^2/g$, or more than 2.5 $m^2/g$, or more than 2.0 $m^2/g$, or more than 1.5 $m^2/g$, or more than 1.0 $m^2/g$ after pressing at 15 $kN/cm^2$ for 10 s (see Materials and Methods section below for the details how the pressure test of the particles is conducted); alternatively or in addition wherein the BET specific surface area (BET SSA) after pressing at 15 $kN/cm^2$ for 10 s does not increase by more than 100%, or more than 80%, or more than 60% compared to the BET specific surface area of the material before pressing;

(ii) a mass loss of non-graphitic carbon according to thermogravimetric analysis (TGA) of less than 5%, or less than 4%, or less than 3%, or less than 2%, or less than 1%, or less than 0.5% (see again Materials and Methods section below for details on the TGA measurement); and/or (iii) a surface crystallinity expressed by an $L_a$ of >4 nm, or >6 nm, or >10 nm, as determined by measuring the $I_D/I_G$ band amplitude ratio via Raman spectroscopy.

The term "aggregated" used in the context of the carbonaceous composite particles shall be understood to refer to a connection through some additional carbon (graphitic or non-graphitic) on the surface of the primary particles (the additional carbon is referred to as "carbonaceous binder material" in the present disclosure). This is in contrast to a mere "agglomeration", where the finer particles are merely held together through relatively weak inter particle interactions (mainly van der Waals forces). Said additional carbon acting as the "glue" holding together the primary particles is derived from a carbonaceous binder precursor material attached to the surface of the primary particles (coating) which has subsequently been converted to non-graphitic or graphitic carbon by a heat treatment of the agglomerated intermediate particles.

It will be understood that the mass loss of any non-graphitic carbon (which may for the purpose of the mass loss parameter include pyrolyzed carbon) generally depends on the thickness and structure of the carbon on the surface of the particles, which in turn depends on the process parameters as well as on the amount and carbon yield of the carbon source employed for the coating of the primary particles. For example, at high temperature (>1850° C.), the binder precursor material is converted almost completely into graphitic or non-graphitic carbon exhibiting very few heteroatoms or defects. Consequently, it was found that the mass loss of primarily pyrolyzed carbon was less than 0.5% in the working examples below, demonstrating that only traces of pyrolyzed or amorphous carbon remain on the surface of the particles.

As can be seen from sample materials obtained according to the process of the present disclosure (cf. FIGS. 1 to 4), the carbonaceous composite particles may be further characterized by a "snowball-like", or "framboidal", or "rose bud-like" morphology, i.e. a distinctive round shape consisting of a multiplicity of distinct smaller primary particles stably connected through the carbon bridges, as described above.

In some embodiments, the carbonaceous composite particles may be further characterized by a near-random or random orientation of the primary particles forming the aggregated composite particle.

Yet another feature that may be used to characterize certain embodiments of the carbonaceous composite particles described herein is that the particles are rather isotropic in terms of their electrical, mechanical, and/or heat-conductive properties, as compared to, for example highly oriented pyrolytic graphite (HOPG) that exhibits anisotropic electrical conductivity by a factor of 1000. Isotropic in the present context should be understood to mean that the respective properties of the particles in different directions does not differ by more than a factor of 40, or more than a factor of 20 or more than a factor of 10 (e.g. as reflected by measured [004]/[110] XRD ratios of <4 or even <3), in contrast to anisotropic unmodified natural or synthetic graphite. For example, the measured [004]/[110] XRD ratio (area) of the graphite material 8 in comparative Example 4 is 180.

The isotropy of the carbonaceous composite particles may in certain embodiments be further characterized by a ratio of the peak areas of the [004] and [110] reflections (peak area % [004]/[110]) of lower than 10, or lower than 8, lower than 6, or lower than 4, or lower than 3, or lower than 2. The small values for the [004]/[110] ratio of the peak areas reflect the isotropic distribution of the crystalline domains within the particle, and thus also the random orientation of the primary particles in the composite particles. The theoretical [004]/[110] ratio for a fully isotropic distribution of the crystalline domains would be 1.56.

In some embodiments, the carbonaceous composite particles according to the present disclosure may be additionally characterized by any one of the following parameters, alone or in combination:

(i) a BET specific surface area (BET SSA) of between 0.3 and 20 $m^2/g$, or of between 1 and 15 $m^2/g$, or between 1 and 10 $m^2/g$, or between 1 and 5 $m^2/g$;

(ii) a crystallite size $L_c$ of less than 300 nm, or less than 250 nm, or less than 200 nm;

(iii) an $L_c/L_a$ ratio of at least 1, or at least 1.5, or at least 2, or at least 2.5, or at least 3; and/or (iv) a xylene density (according to DIN 51 901) of at least 2.00 $g/cm^3$, or at least 2.10 $g/cm^3$, or at least 2.15 $g/cm^3$ or at least 2.20 $g/cm^3$;

(v) a spring-back of between 10 and 90%, or between 15 and 80%, or between 20 and 70%, or between 30 and 60%; and/or (vi) the carbonaceous binder material connecting said primary particles being graphitic, or non-graphitic carbon, or both.

With regard to the latter, the carbonaceous binder material attached to the surface of said primary particles of the carbonaceous composite particles according to the present disclosure is in some embodiments graphitic carbon, i.e., the carbonaceous binder precursor material coating the primary particles has been converted to graphitic carbon during the heat treatment step at elevated temperatures above 1850° C. for a sufficient time to achieve the graphitization of the binder attaching the primary particles to their neighbors. In such embodiments, the binder present on the surface of the composite particles is typically also converted to graphite, which means that such particles have a relatively high surface crystallinity. However, since it is not excluded that the resulting composite particles may be additionally modified subsequently to the heat treatment, in some embodiments, the surface may also be coated with, for example, other materials such as amorphous carbon despite the fact that the binder is still graphitic carbon (e.g. through a subsequent CVD coating and the like).

In other embodiments, the carbonaceous binder material attached to the surface of said primary particles of the carbonaceous composite particles according to the present disclosure is non-graphitic carbon, i.e., the carbonaceous binder precursor material coating the primary particles has only been carbonized (not converted to graphitic carbon, or not entirely) during the heat treatment step at elevated temperatures above 1850° C. It is readily apparent that composite particles where parts of the binder have been graphitized and other parts of the binder in the composite particles have only been carbonized represent another possible embodiment of the present disclosure. It will be understood that the degree of graphitization of the binder precursor material can be influenced by the conditions and duration of the heat treatment applied to generate the composite particles of the present disclosure.

A related, but independent parameter possibly characterizing the carbonaceous composite particles is the interlayer distance c/2. In certain embodiments, the carbonaceous composite particles are characterized by an interlayer distance c/2 of 0.338 nm or less, or 0.337 nm or less. Such composite particles are referred to herein as "graphitic composite particles". In other embodiments, the carbonaceous composite particles are characterized by an interlayer distance c/2 of more than 0.338 nm, more than 0.339 nm, or more than 0.340 nm. Such composite particles are referred to herein as "non-graphitic composite particles".

For most applications it is desirable that the average size of the particles does not exceed 30-40 µm. Since the composite particles are by definition formed by a multiplicity of primary carbonaceous particles, the average length of the major axis of the primary particles as observed by scanning electron microscopy (SEM) is in certain embodiments between 1 and 15 µm, or between 1 and 10 µm, or between 1 and 7 µm, or even between 1 and 5 µm, as for example illustrated in FIGS. 1 to 4.

The primary particles forming the carbonaceous composite particles may in most embodiments be selected from a carbonaceous material such as natural graphite, synthetic graphite, graphene, graphene nanoplatelets, graphene or carbon fibers, fullerenes, nanographite, hard carbon, soft carbon, petroleum- or coal-based coke, graphitized fine coke, char, carbon black, carbon nanotubes (CNT), including single-walled nanotubes (SWNT), multiwalled nanotubes (MWNT), or mixtures of any of the foregoing. The carbonaceous material forming the primary particles in the composite particles described herein may in certain embodiments be mixed with one or more non-carbonaceous materials, such as silicon, silicon oxide, tin, tin oxide or tin dioxide, aluminum, bismuth, lithium titanate, or mixtures of any of the foregoing non-carbonaceous materials. However, given that the heat treatment step at elevated temperatures may lead to undesirable chemical reactions (e.g. as the formation of silicon carbide), non-carbonaceous primary particles are not preferred.

In order to achieve a high level of isotropy of the particles, it is in certain embodiments desirable that even the primary particles in the composite particles exhibit a shape that is as spherical as possible. Since natural graphite typically has a flake-like morphology, it is not possible to provide such spherical primary particles from unmodified natural graphite, unless they are ground to a very small size in which case the anisotropic morphology becomes less pronounced. Thus, modified, rounded graphite (synthetic or natural) or non-graphitic particles (such as coke) can be used as primary particles in such embodiments. Suitable examples include coke, carbon black, graphitized fine coke, spherical (synthetic or natural) graphite, or micronized ultrafine or submicron-sized synthetic or natural graphite, and the like.

It is apparent that the primary particles may not necessarily be homogeneous. Thus, in some embodiments the primary particles are selected from a single material, optionally from a single carbonaceous material, as listed above. In other embodiments, the primary particles are selected from at least 2, 3, 4, or at least 5 different carbonaceous or non-carbonaceous materials. Preferably at least one material forming the primary particles is a carbonaceous material.

As explained above, the carbonaceous binder material connecting the multiplicity of primary particles can be graphitic, non-graphitic, or both. This does not only depend on the heat treatment condition and duration, but also on the selection of the carbonaceous binder precursor material that is converted into carbon during the formation of the composite particles of the present disclosure.

The carbonaceous binder material is, already for reasons of economy, in some embodiments the same for all primary particles in the composite particle, i.e. only one type of carbonaceous binder precursor material has been used for the preparation of the composite particles. However, in certain embodiments, it may be advisable to use different carbonaceous binder precursor material, which may lead to carbonaceous composite particles wherein the carbonaceous binder material is not identical/different for at least a portion of the primary particles in the composite particle. In these embodiments, at least 2, 3, 4, 5, or more different carbonaceous binder materials may be present in a composite particle.

This can be achieved by using at least 2, 3, 4, 5, or more differing carbon binder precursor materials which result in different carbon layers after the heat treatment step. Alternatively, the same carbonaceous binder precursor material or different carbonaceous binder precursor materials can also lead to different carbonaceous binders when the multiple carbonaceous binder precursor materials are attached to the surface of the primary particles by different coating methods, which may likewise have an influence on the final structure of the binder inside the composite particles.

In terms of suitable techniques for obtaining the carbonaceous binder material attached to the surface of the primary particles, these include, but are not limited to the following techniques generally known in the art:
(i) mixing of primary carbonaceous particles with a carbonaceous binder precursor material and subsequent carbonization of said carbonaceous binder precursor material;
(ii) mixing of primary carbonaceous particles with a carbonaceous binder precursor material and subsequent graphitization of said carbonaceous binder precursor material;
(iii) melting of a carbon precursor onto the primary particles;
(iv) pitch-coating,
(v) pyrolysis,
(vi) evaporation.

Of these, creating a dispersion—with or without solvent—with the primary carbonaceous particles and the carbonaceous binder precursor material (e.g. by mixing the two components together, followed by drying of the dispersion if necessary), and subsequent agglomeration and heat treatment to effect conversion of the binder precursor material into carbonized/graphitized binder holding together the primary particles in the composite material is particularly suitable due to its simplicity and possibility to use environmentally friendly processes and materials, e.g. a coating based on non-hazardous organic precursor molecules with water as a solvent. However, other methods to attach the precursor to the surface of the primary particles can likewise be used, provided the coated particles can be assembled into agglomerated intermediate particles that undergo a heat treatment as described herein below in more detail.

The carbonaceous composite particles according to the present disclosure may in certain embodiments be further characterized by a particle size distribution (PSD) of the composite particles having (i) a $D_{90}$ value ranging from 5 to 70 µm, or from 10 to 50 µm, or from 12 to 30 µm; or from 12 to 25 µm and/or (ii) a $D_{50}$ value ranging from 2 to 30 µm, or from 5 to 25 µm, or from 10 to 20 µm and/or (iii) a $D_{10}$ value ranging from 0.5 to 20 µm, or from 2 to 10 µm, or from 3 to 8 µm.

In some preferred embodiments, the particle size distribution value $D_{90}$ does not exceed 35 µm, or does not exceed 30 µm, or does not exceed 25 µm.

As briefly noted below, in some embodiments, especially when the heat treatment was not carried out for long enough to fully graphitize the binder on the surface of the particles, the carbonaceous composite particles may be further characterized by a non-graphitic (e.g. pyrolyzed or amorphous) carbon coating on the surface of the composite particles. This may for example be assessed by determining the amplitude ratio of the amplitudes of the D and G bands in RAMAN spectroscopy ($I_D/I_G$).

Given that the novel process of the invention allows the use of non-hazardous carbon precursors for the coating of the primary particles (i.e. (coal tar) pitch coatings are not required), the carbonaceous composite particles according to the present disclosure can in some instances be further characterized by having a low polycyclic aromatic hydrocarbon (PAH) concentration. The PAH concentration of these particles in these instances is less than 200 mg/kg, less than 150 mg/kg, less than 100 mg/kg, less than 30 mg/kg, less than 10 mg/kg, less than 5 mg/kg, less than 2 mg/kg, less than 1 mg/kg, or even less than 0.5 mg/kg.

Finally, the carbonaceous composite particles may in some embodiments further comprise an additive selected from the group consisting of carbon black, colloidal graphite, graphene, graphene nanoplatelets, graphene or carbon fibers, fullerenes, nanographite, hard carbon, soft carbon, petroleum- or coal-based coke, graphitized fine coke, char, carbon nanotubes (CNT), including single-walled nanotubes (SWNT), multiwalled nanotubes (MWNT), metals/metalloids such as silicon, aluminum, tin, silver, copper, nickel, antimony, germanium, metal/metalloid oxides such as $TiO_2$, lithium titanate, $SiO_x$, or $SnO_x$, chalcogenides, or metal alloys, optionally wherein the metals/metalloids are selected from silicon, aluminum, or tin, or alloys comprising said metals.

The carbonaceous composite particles are in certain embodiments further characterized by a Scott density (apparent or poured density) of above about 0.25 g/cm$^3$, or above about 0.30 g/cm$^3$, or above about 0.33 g/cm$^3$.

In some embodiments of this aspect of the present invention, the carbonaceous composite particles may be further characterized by a porosity determined by mercury intrusion porosimetry of at least about 50%, or at least about 60%, or at least about 65%, or 70%.

Finally, the carbonaceous composite particles may in certain embodiments be further characterized by, inter alia, a high lithium acceptance, increased power and electrochemical capacity, fast charge and discharge performance, and favorable low temperature performance. For example, in certain embodiments the carbonaceous composite particles described herein may be further characterized by a charge/discharge rate capability 2 C/0.2 C of at least 97%, or at least 98%, or at least 99%, or at least 99.5% when present as an active material in a negative electrode of a lithium-ion battery. The charge/discharge rate capability is one of the most relevant properties of cathode materials for lithium batteries that would be advantageous to improve, in particular when envisaging high power density applications such as automotive applications.

Another aspect of the present disclosure relates to compositions comprising the carbonaceous composite particles as defined herein.

In some embodiments, the composition comprising the carbonaceous composite particles as defined herein is mixed together with one or more other types of carbonaceous composite particles as defined herein, but different from the first carbonaceous composite particles (i.e. mixtures of at least two different carbonaceous composite particles according to the present disclosure). For example, composite particles made from different carbon precursors, such as (non-graphitizable) hard carbon, and graphitic or graphitizable starting materials, may be combined, resulting in isotropic carbon active materials that exhibit the favorable high rate properties of hard carbon-type active materials ($L_c$ of about 10 nm) and the high capacity provided by graphitic active materials (with an $L_c$>70 nm).

Alternatively or in addition, the composition comprising the carbonaceous composite particles or the composition comprising a mixture of at least two types of carbonaceous composite particles as defined herein may further contain yet another type of unmodified or modified carbonaceous particles. In particular, as illustrated in Example 4, it has been found that mixing the carbonaceous composite particles as described herein with a high capacity but less spherical graphitic active material, e.g. as disclosed in WO 2016/008951, may yield an active carbonaceous material with excellent electrochemical properties. Accordingly, in some embodiments, the present invention relates to compositions comprising the carbonaceous composite particles as described herein in a mixture with one or more high capacity surface-modified hydrophilic graphite(s).

Process for Preparing Carbonaceous Composite Particles

One aspect of the present disclosure relates to a novel process for preparing carbonaceous composite particles such as the carbonaceous composite particles described and characterized herein. With the novel process, it is possible to produce highly isotropic carbonaceous, e.g. graphitic, composite particles that exhibit advantageous properties in terms of their electrochemical behavior and their mechanical stability. The combined favorable properties make such particles an extremely promising active material in negative electrodes in lithium-ion batteries, for example in the automotive sector and related areas where it is important to employ lithium-ion batteries characterized not only by a high reversible capacity but also by a fast charge and discharge performance.

The novel process ensures that the resulting isotropic composite particles have isotropically distributed pores allowing high lithium-ion diffusion rates at high charge/discharge currents and offering a sufficiently high power density of the cell. At the same time, the process of the present disclosure allows the production of composite particles that exhibit markedly improved mechanical properties wherein the aggregated primary particles are able to withstand pressure and shear forces applied to the particles during the manufacturing process for making negative electrodes, for example for lithium-ion batteries. This is due to the fact that the primary particles forming the isotropic composite particles are attached to each other through a carbonaceous (graphitic or non-graphitic) binder, as opposed to the mere aggregation of primary particles through van der Waals forces as described in the prior art.

Hence, in this aspect of the disclosure, the process is a multi-step process (although several of the steps can be combined or carried out in a single reactor, as will be explained in greater detail below). One step of this process generally comprises the attachment of a carbonaceous binder precursor material to the surface of carbonaceous particles ("primary particles"), optionally in the presence of a solvent, thereby forming a coating of the carbonaceous particles by the carbonaceous binder precursor material ("step (a)"). If a solvent was used in the coating step (a), the dispersion is subsequently dried (by any suitable means) to remove any solvent from the coated particles ("step (b)"). During or after the coating and/or the drying step, the process further comprises causing agglomeration of the coated primary carbonaceous particles ("step (c)"). After agglomeration into composite intermediate particles formed by a multiplicity of coated primary carbonaceous particles, the dry agglomerated particles are optionally subjected to a high temperature treatment between about 1850 and 3500° C. so as to yield carbonaceous composite particles composed of a multiplicity of aggregated primary particles, wherein said primary particles are held together by a carbonaceous binder material attached to the surface of the primary particles ("step (d)").

In this process, the primary particles are eventually attached to each other (or "glued" together) by the carbonaceous binder precursor material which is converted to a carbonaceous or even graphitic binder during the heat treatment at temperatures of above 1850° C. up to about 3500° C. (the latter is for practical and economic reasons a reasonable upper limit for the maximum temperature during the heating step).

As apparent from the general description of the process, this process can be characterized as a "retrosynthetic" or "bottom-up" process for constructing highly desirable isotropic graphitic (or non-graphitic) composite particles with a number of desired properties that can be influenced or fine-tuned by the appropriate choice of starting materials and process parameters/conditions, as explained in greater detail herein below.

Although not limited to such particles, the carbonaceous composite particles obtained by the process of the present disclosure will in most embodiments be characterized by the parameters as described herein above or in the appended claims.

Typically, the carbonaceous particles employed in the coating step ("step (a)") can be selected from the group consisting of natural graphite, synthetic graphite, graphene, graphene or carbon fibers, fullerenes, nanographite, hard carbon, soft carbon, petroleum- or coal-based coke, graphitized fine coke, char, carbon black, carbon nanotubes (CNT), including single-walled nanotubes (SWNT), multiwalled nanotubes (MWNT), or mixtures of any of the foregoing. In certain embodiments, non-carbonaceous materials such as silicon, silicon oxide, tin, tin oxide or tin dioxide, aluminum, bismuth, lithium titanate, or mixtures of any of the foregoing may also be added in particulate form to the carbonaceous primary particles ("non-homogenous mixture of primary particles").

As explained above, particularly good results in terms of their isotropy have been achieved with primary particles that have less anisotropy than natural graphite flakes. Accordingly, in certain embodiments, the carbonaceous particles employed in step (a) are non-graphitic particles, preferably selected from the group consisting of hard carbon, soft carbon, petroleum- or coal-based coke, graphitized fine coke, char, carbon black and mixtures thereof. In some particularly preferred embodiments, the carbonaceous particles to be coated are selected from fine petroleum- or coal-based coke, carbon black; optionally mixed together with graphitic particles.

The particle size distribution of the carbonaceous particles employed in step (a) is in most embodiments characterized by a $D_{90}$ of <35 µm, or <30 µm, or <25 µm, or <20 µm, and/or by a $D_{50}$ of <about 20 µm, <about 15 µm, or <about 10 µm. In order to obtain composite particles that do not exceed a $D_{50}$ of about 20 to 25 µm, the $D_{90}$ of the primary particles should be<about 20 µm, and/or the $D_{50}$ should be<about 15 µm.

In terms of the shape or morphology of the primary particles, the carbonaceous particles to be coated in step (a) may exhibit in some embodiments a sphericity Q3 [S=0.8] of equal or more than 22%, or more than about 30%, 40%, 50%, i.e. more than e.g. 22% of the primary particles have a sphericity of at least 0.8, as determined by dynamic imaging (see Methods section for details on how this parameter is determined).

The term carbonaceous binder precursor material in the present context should be understood to encompass any suitable carbon-containing molecule that upon heating in an inert atmosphere can be converted to pure non-graphitic or graphitic carbon.

Thus, the carbonaceous binder precursor material to be used in step (a) of the process is in some embodiments selected from the group consisting of polymers, such as a lignin-based polymer, a polystyrene or derivative thereof, a styrene-butadiene copolymer, melted phenol resin, polyvinylalcohol, polyfurfuryl alcohol, furfural, polyurethane, polystyrene-acrylate, polyacrylate, polymethylmethacrylate, polymethacrylonitrile, polyoxymethylene, poly(methyl atropate), polyisobutene, polyethyleneoxide, polypropyleneoxide, polyethylene, polypropylene, polymethylacrylate, polybutadiene, polyisoprene, polyacrylonitrile, polyaniline, tannic acid, starch, gum arabic, maltodextrin, formaldehyde phenol resins, formaldehyde tetrahydrofuran resins, nitrile butyl rubber, sucrose, glucose, or other sugars, polyethyl ether ketone, polyphenylene sulfide, polyvinyl chloride, carboxymethylcellulose, methyl cellulose, gelatins, polyvinyl pyrrolidone, polylactic acid, latexes thereof, a hydrocarbon gas such as methane, ethane, ethylene, propane, propene, acetylene, butane, benzene, toluene, xylene, or an alcohol such as ethanol, propanol, isopropanol (optionally mixed with an inert carrier gas), and combinations thereof. It will be understood that the choice of suitable carbonaceous binder precursor material also depends on the technique to coat, i.e. attach the binder precursor material, to the surface of the primary carbonaceous particles, as detailed below.

While in general not being limited in terms of its weight ratio, the amount of carbonaceous binder precursor material relative to the amount of the carbonaceous primary particles is typically below 30% (w/w), e.g. about 15 to 18%. In some embodiments, the amount of binder precursor material is about 18%, or about 15%, or below about 15%, or below about 14%, or below about 12% or below about 10%, or below about 5% (w/w) of the amount of carbonaceous primary particles to be coated with the binder precursor material. The inventors have found that it is possible to achieve the desired result of producing mechanically stable, highly isotropic aggregate particles by using a relatively low amount of binder that is apparently sufficient to stably connect the primary particles with each other upon conversion of the binder precursor material to carbon or graphite (see working examples where the amount of binder precursor material was about 15% to 18% (w/w)).

In any event, the carbonaceous binder precursor material used in step (a) of the process in some embodiments is not or does not include ammonium lignosulfonate. In other embodiments, the carbonaceous binder precursor material used in step (a) of the process is not or does not include coal tar, tar pitch, and petroleum pitch, and, optionally also no ammonium lignosulfonate. Substances like coal tar, tar pitch, and petroleum pitch could from a technical point of view be used in the process of the present disclosure, but they are clearly undesirable since they are known or suspected to be carcinogenic or hazardous substances that should be avoided whenever possible.

Any suitable method to attach the carbonaceous binder precursor material to the surface of the primary carbonaceous particles can be used in the context of the present disclosure. In certain embodiments, suitable methods to attach the carbonaceous binder precursor material to the surface of the carbonaceous primary particles include but are not limited to the following methods selected from the group consisting of
(i) mixing to form a dispersion, optionally in the presence of a solvent and subsequent drying;
(ii) melting the carbonaceous binder precursor onto the primary particles;
(iii) pyrolysis; and
(iv) evaporation.

In some embodiments, it is preferred that the coating is accomplished by mixing the carbonaceous primary particles with the carbonaceous binder precursor material to form a dispersion. Preferably, the mixing is carried out in the presence of a solvent.

The solvent is typically a polar solvent. The solvent may in some embodiments be selected from water, methanol, ethanol, propanol, isopropanol, acetone, or mixtures thereof, with water being particularly preferred due to its environmentally friendly, non-hazardous properties.

In other embodiments, the carbonaceous binder precursor material may also be melted on the carbonaceous particles, which may be accomplished by heating the mixture of carbonaceous particles and the carbonaceous binder precursor material until the precursor material melts and adheres to the surface of the carbonaceous particles, thereby forming a coating on the surface of the carbonaceous primary particles.

If desired, further additives can in some embodiments be added during step (a).

Suitable additives may include but are not limited to citric acid, ammonia, acetic acid, formic acid, malic acid, stearic acid, or combinations thereof.

As noted above, when the coating step (a) includes a solvent, the solvent must be removed before converting the carbonaceous binder precursor material attached to the surface of the primary particles. As a first step, it is often useful to simply filter off the dispersion (comprising the coated primary particles) to remove the bulk of the solvent. Any residual solvent can in principle be removed by suitable, well-known techniques for removing solvent. Suitable techniques include well-known drying methods such as freeze-drying, evaporation in a regular atmosphere, or evaporation under a reduced pressure/vacuum, optionally at elevated temperatures, or drying in an optionally heated inert gas stream.

While the drying step is optional and by definition linked to the presence of a solvent in step (a), the subsequent agglomeration of the coated primary particles is at any rate a mandatory key feature of the process of the present disclosure.

In general, any suitable method to achieve agglomeration of the primary particles can be used in step (c) of the process described and claimed herein. It will be understood that the process of agglomeration of the primary particles can take place already during the mixing of binder precursor material and carbonaceous particles, or, in case a solvent is used, it can be achieved during the drying step to remove any residual solvent. However, agglomerates can also be formed after the mixing and optional drying steps (steps (a) and (b), respectively) by any suitable technique known in the prior art.

One well-known suitable technique to achieve agglomeration of primary (coated) particles is the spray-drying of a dispersion comprising the primary carbonaceous particles and the carbonaceous binder precursor material.

Adjusting the spray-drying conditions allows varying the particle size of the final particles prior to the subsequent heat treatment steps. In this regard, the spray formation and consequent contact of the droplets with the hot air in the chamber are its main characteristics. It was found that the size of the droplets created during the atomization step as well as the solvent evaporation rate correlate strongly with the particle size of the final product. The hot air flow is typically co-current which ensures that the spray evaporation is rapid and the dried product does not experience any significant heat degradation. Once the solvent fully evaporates from the droplets, the dried product is entrained in the hot air flow from which it can be separated, for example by a cyclone. The process parameters such as inlet temperature, outlet temperature, pump speed, and gas flow for atomization, of the spray dryer can be optimized individually, depending on the desired characteristics of the particles, as is well-known to those of skill in the art. Further details, such as suitable devices and process conditions, are described in more detail in the working examples below.

Additional information can also be taken from PCT/EP2015/058112 which is incorporated by reference in its entirety.

However, the drying of step (b) and the agglomeration of step (c) may in some embodiments also be achieved by vacuum-drying a dispersion comprising the primary carbonaceous particles and the carbonaceous binder precursor material obtained from step (a) in a heatable vacuum reactor. This drying process will automatically lead to suitable agglomerates, provided the particle size distribution of the primary particles allows their agglomeration under the chosen drying conditions.

Alternatively, the drying of step (b) and the agglomeration of step (c) may be achieved by freeze-drying a dispersion comprising the primary carbonaceous particles and the carbonaceous binder precursor material obtained from step (a) in a stirred freeze dryer.

The drying of step (b) and the agglomeration of step (c) may in certain embodiments be also achieved by flash-drying a dispersion comprising the primary carbonaceous particles and the carbonaceous binder precursor material obtained from step (a) in a flash dryer.

Yet another possible way to accomplish the drying of step (b) and the agglomeration of step (c) is by drying a fluidized dispersion comprising the primary carbonaceous particles and the carbonaceous binder precursor material obtained from step (a) in a fluidized bed dryer, optionally in combination with a spray system.

The drying of step (b) and the agglomeration of step (c) may also be achieved by disc drying a dispersion comprising the primary carbonaceous particles and the carbonaceous binder precursor material obtained from step (a) in a disc dryer.

Alternatively, the drying of step (b) and the agglomeration of step (c) may be achieved by paddle drying a dispersion comprising the primary carbonaceous particles and the carbonaceous binder precursor material obtained from step (a) in a paddle dryer.

The drying of step (b) may in some embodiments also include the filtering of the dispersion comprising the primary carbonaceous particles and the carbonaceous binder precursor material obtained from step (a) and drying the resulting filtered cake in one of the suitable dryers mentioned above.

The carbonaceous binder precursor material attached to the surface of the agglomerated particles obtained from step (c) is then, if necessary, carbonized by subjecting the particles to a heat treatment under vacuum or an inert atmosphere, optionally under a nitrogen or argon atmosphere, at temperatures generally ranging from 400° C. to 3500° C., thereby causing a thermal decomposition of the precursor material. Temperatures of about 400° C. to 600° C. are generally regarded as sufficient to carbonize any carbonaceous precursor material present on the surface of the primary particles, although higher temperatures will likewise convert the precursor material to amorphous carbon or, at temperatures above about 2000° C., to graphitic carbon.

It is therefore apparent that the carbonization of the precursor may be carried out in a separate heat treatment step prior to step (d), or it may be carried out as part of the heat treatment step (d) with a controlled ramp up of the temperatures in the reactor. In addition, it will be understood that since the agglomeration step (c) may already use heating, steps (c) and (d) (and possibly also step (b), i.e. drying of the dispersion) may in some embodiments also be carried out simultaneously.

For example, a suitable heating scheme may include heating the agglomerated particles under vacuum or in an inert atmosphere first up to 400 to 800° C., keeping the particles at that temperature for a sufficient time to carbonize the precursor material and to remove any gases from the thermal decomposition of the precursor material, followed by increasing the temperature to above 1850° C. (and up to 3500° C.) and keeping the particles for a sufficient time to convert at least a portion of any amorphous carbon derived from the precursor material to graphitic carbon. Alternatively, the carbonization can also be carried out in a separate step and/or a separate reactor.

In any event, it is in certain embodiments preferred to first carbonize the precursor material at lower temperatures of between 400° C. to 800° C. to allow the complete removal of any gases generated by the thermal decomposition of the precursor material, before heating the agglomerated particles to temperatures above 1850° C. to obtain the stable, highly isotropic composite particles composed of aggregated primary particles connected to each other by the non-graphitic or graphitic binder.

In some embodiments of this aspect of the disclosure, it is preferred that the heat treatment of step (d) is carried out at temperatures and for a sufficient time to convert any non-graphitic carbon in the intermediary agglomerated particles obtained from step (c) to graphitic carbon. In other embodiments, the heating step (d) will not convert all amorphous carbon to graphitic carbon. In both cases, particles exhibiting favorable electrochemical and mechanical properties have been obtained.

The process may in certain embodiments encompass a pre-treatment step prior to the heat treatment step (d), wherein the coated agglomerated carbonaceous particles are subjected to a pre-treatment performed under vacuum, air, nitrogen, argon or a $CO_2$ atmosphere at temperatures of below 1100° C., or below 700° C. to modify the surface of the agglomerated particles.

In yet other embodiments, the process may also include an additional heat treatment step ("post-treatment step") after step (d). In this post-treatment step, the composite particles obtained from step (d) are subjected to an additional heat treatment in a gas atmosphere such as nitrogen, argon, mixtures of nitrogen with hydrocarbons like acetylene, propane or methane, or with oxidative gases such as air, steam, or $CO_2$ to adjust the morphology and surface chemistry of the carbonaceous composite particles. The post-treatment is typically carried out at temperatures of between 300° C. and 1500° C. In some embodiments, this additional heat treatment step ("post-treatment step") is performed by contacting the composite particles with an oxidant either in a gaseous/solid phase process with air, carbon dioxide, water vapor, oxygen, ozone, or any combination thereof, or, alternatively, in a liquid/solid phase process with aqueous hydrogen peroxide or other oxidants present in said liquid phase. Such a post-treatment may for example be employed in order to increase the hydrophilicity of the resulting particles. Further information on the aforementioned post-treatment steps may for example be found in WO 2013/149807 or in PCT/EP2015/066212, both to Imerys Graphite & Carbon, which are incorporated by reference in their entirety.

Another possible post-treatment step (i.e. after step (d)) may in some embodiments include an additional coating step of the resulting composite particles, such as a CVD coating or a PVD coating and the like. It is readily apparent that a subsequent coating with an amorphous carbon layer will change the surface characteristics of the resulting composite particles (in the case of CVD coating for example a lower BET SSA, lower porosity, a lower surface crystallinity, etc.).

In a particularly preferred embodiment, the process is carried out with fine ($D_{90}$ below 20 μm and a $D_{50}$ of below 10 μm) non-graphitic carbonaceous particles as a starting material. Such non-graphitic particles (e.g. fine coke or carbon black) are already less anisotropic than graphite particles. These particles are then coated with a carbonaceous binder precursor material in the presence of a solvent. The resulting dispersion is subsequently spray-dried to cause removal of the solvent and agglomeration of the primary, coated particles. The obtained agglomerated intermediate particles are then subjected to a heat treatment, first at around 400 to 600° C. and then to a heat treatment at above 1850° C. in order to generate the carbonaceous (and in many instances at least partially graphitic) composite particles described herein. Such a process is for example described in further detail in the Examples below.

The resulting carbonaceous composite particles obtained by the process described herein exhibit favorable electrochemical and mechanical properties as explained above.

Accordingly, a further aspect of the present invention therefore relates to carbonaceous composite particles as described herein which are obtainable by a process according to the present invention, as described in detail in the present disclosure. The carbonaceous composite particles obtainable from the process of the invention are in some embodiments characterized by the parameters as set out herein above and in the appended claims.

Compositions Comprising Carbonaceous Composite Particles

Another aspect of the present invention relates to compositions comprising said carbonaceous composite particles. In some embodiments of this aspect, the composition comprises mixtures of carbonaceous composite particles, wherein the particles are different from each other, e.g. made by a different process or with different starting materials. The compositions may in other embodiments furthermore, or alternatively, comprise other unmodified (e.g. natural or synthetic graphite) or modified carbonaceous, e.g. graphitic or non-graphitic particles. Thus, in other words, compositions comprising carbonaceous composite particles according to the present disclosure with other carbonaceous or non-carbonaceous materials, in various ratios (e.g. from 1:99 ('Yow/w) to 99:1 (% w/w)) are also contemplated by the present disclosure. In certain embodiments, unmodified graphite may be added to the carbonaceous composite particles at various stages of making the products described herein.

Uses and Secondary Products Comprising the Carbonaceous Composite Particles

Yet another aspect of the present invention relates to the use of the carbonaceous composite particles or the composition comprising said carbonaceous composite particles as described herein for preparing a negative electrode material for lithium-ion batteries. Another, related aspect of the present disclosure relates thus to a negative electrode of a lithium-ion battery and/or to a lithium-ion battery comprising the carbonaceous composite particles or the composition comprising said carbonaceous composite particles as described herein as an active material in the negative electrode of the battery. For instance, a composition comprising a binder and the carbonaceous composite particles or the composition comprising said carbonaceous composite particles as described herein could be used to produce a negative electrode.

In yet another aspect, the present disclosure relates to an energy storage device comprising the carbonaceous composite particles or the composition comprising said carbonaceous composite particles as described herein.

A further aspect of the present disclosure relates to a carbon brush comprising the carbonaceous composite particles or the composition comprising said carbonaceous composite particles as described herein.

Polymer composite materials comprising the carbonaceous composite particles or the composition comprising said carbonaceous composite particles as described herein represent another aspect of the present disclosure.

An electric vehicle, hybrid electric vehicle, or plug-in hybrid electric vehicle which comprises a lithium-ion battery, wherein the lithium-ion battery comprises the carbonaceous composite particles or the composition comprising said carbonaceous composite particles as described herein as an active material in the negative electrode of the battery is another aspect of the present disclosure. In some embodiments of this aspect, the carbonaceous particles comprise only graphitic material, while in other materials the carbonaceous particles may also comprise non-graphitic material.

Due to the larger size of sodium ions as compared to lithium-ions, sodium ions typically do not undergo intercalation with graphite, but are rather adsorbed on the carbon surface, especially inside pores with a sufficiently large diameter. The importance of isotropic electrolyte-filled pores with low tortuosity in order to obtain favorable sodium-ion diffusion in negative electrodes is however analogous to lithium-ion battery electrodes. Thus, a sodium-ion battery comprising the carbonaceous composite particles or the composition comprising said carbonaceous composite particles as described herein represents another aspect of the present invention.

Yet another aspect of the present disclosure relates to a carbon-based coating exhibiting isotropic electric, mechanical or heat-conducting properties, wherein said coating comprises the carbonaceous composite particles or the composition comprising said carbonaceous composite particles as described herein. A related aspect thus refers to the use of said carbon-based coating as a coating of current collectors in batteries.

Dispersions comprising the carbonaceous composite particles or the composition comprising said carbonaceous composite particles as described herein are yet another aspect of the present disclosure. Such dispersions are typically liquid solid dispersions, i.e. they also include a solvent. Suitable solvents may in some embodiments include water, or N-methyl-2-pyrrolidone (NMP), both commonly used as solvents for carbon-based dispersions.

Finally, the present disclosure relates to a method for preparing a building block of a negative electrode, employing the carbonaceous composite particles or the composition comprising said carbonaceous composite particles as described herein. Given that the composite particles already have a near optimal shape and pore distribution, the use of the carbonaceous composite particles as described herein in the manufacture of negative electrodes allows dispensing additional steps that must otherwise be included to ensure that the graphite particles in the electrode are distributed in an isotropic fashion (i.e. avoiding a preferred orientation in case of conventional anisotropic graphite particles). The composite particles therefore represent a "pre-fabricated" building block that can be used in the manufacture of negative electrodes for lithium-ion batteries.

The concept of preparing a building block for a negative electrode that exhibits both, favorable energy density and favorable charge/discharge performance at C-rates of 2 C (i.e. a charge/discharge within 30 min) or faster was further developed by preparing "snowball" carbon powders based on both coke and graphite (cf. Example 4 and Table 4 below) as precursor material. The latter allows the fine-tuning of the pore size distribution in order to achieve an optimal Li-diffusion in the electrode, as indicated by the characterization of the materials through mercury porosimetry.

Furthermore, it was demonstrated that mixing such snowball carbon powders with high capacity but less spherical graphitic active materials (e.g. 30% snowball carbon powder and 70% high capacity graphite, see Example 4), leads to a dramatic power performance increase (cf. Table 5). Accordingly, by mixing snowball carbon powders with high capacity graphites, energy density, power performance as well as production costs can be favorably adjusted to specific applications, such as automotive batteries (employed in electric vehicle, hybrid electric vehicle, or plug-in hybrid electric vehicle), grid storage batteries, or batteries for other applications.

Methods

BET Specific Surface Area (BET SSA)

The method is based on the registration of the absorption isotherm of liquid nitrogen in the range $p/p_0=0.04-0.26$, at 77 K. Following the procedure proposed by Brunauer, Emmet and Teller (Adsorption of Gases in Multimolecular Layers, *J. Am. Chem. Soc.*, 1938, 60, 309-319), the monolayer adsorption capacity can be determined. On the basis of the cross-sectional area of the nitrogen molecule, the monolayer capacity and the weight of the sample, the specific surface area can then be calculated.

BET Specific Surface Area after Pressing at 15 $kN/Cm^2$

The BET Specific Surface Area is measured as described above after pressing the powder sample in a piston with a press force of 15 $kN/cm^2$ for 10 s (pressing ramp duration: 5 s). More specifically, 0.5 g of a graphite/carbon powder sample were inserted between 2 steel discs into a pellet press (PIKE Technologies, USA) with a cylindrical hole diameter of 13 mm. The steel piston (PIKE Technologies, USA) was inserted into the cylindrical hole. With a hydraulic press (P/O/Weber, Germany) an automatic protocol was run as follows:

1) increase press force from 0 kN to 20 kN (15 $kN/cm^2$) over the course of 5 s;
2) keep press force constant at 20 kN for 10 s;
3) decrease press force from 20 kN to 0 kN over the course of 5 s.

After completion of the protocol and repetition of the procedure in order to obtain sufficient material, the BET specific surface area of the powder was measured as described above.

X-Ray Diffraction

XRD data were collected using a PANalytical X'Pert PRO diffractometer coupled with a PANalytical X'Celerator detector. The diffractometer has the following characteristics shown in Table 1:

TABLE 1

| Instrument data and measurement parameters | |
| --- | --- |
| Instrument | PANalytical X'Pert PRO |
| X-ray detector | PANalytical X'Celerator |
| X-ray source | Cu-$K_\alpha$ |
| Generator parameters | 45 kV - 40 mA |
| Scan speed | 0.07°/s (for $L_c$ and c/2) |
| | 0.01°/s (for [004]/[110] ratio) |
| Divergence slit | 1° (for $L_c$ and c/2) |
| | 2° (for [004]/[110] ratio) |
| Sample spinning | 60 rpm |

The data were analyzed using the PANalytical X'Pert HighScore Plus software.

Interlayer Spacing c/2

The interlayer space c/2 is determined by X-ray diffractometry. The angular position of the peak maximum of the [002] and [004] reflection profiles are determined and, by applying the Bragg equation, the interlayer spacing is calculated (Klug and Alexander, X-ray Diffraction Procedures, John Wiley & Sons Inc., New York, London (1967)). To avoid problems due to the low absorption coefficient of carbon, the instrument alignment and non-planarity of the sample, an internal standard, silicon powder, is added to the sample and the graphite peak position is recalculated on the basis of the position of the silicon peak. The graphite sample is mixed with the silicon standard powder by adding a mixture of polyglycol and ethanol. The obtained slurry is subsequently applied on a glass plate by means of a blade with 150 μm spacing and dried.

Crystallite Size $L_c$

Crystallite size is determined by analysis of the [002] and [004] X-ray diffraction profiles and determining the widths of the peak profiles at the half maximum. The broadening of the peak should be affected by crystallite size as proposed by Scherrer (P. Scherrer, Göttinger Nachrichten 2, 98 (1918)). However, the broadening is also affected by other factors such X-ray absorption, Lorentz polarization and the atomic scattering factor. Several methods have been proposed to take into account these effects by using an internal silicon standard and applying a correction function to the Scherrer equation. For the present disclosure, the method suggested by Iwashita (N. Iwashita, C. Rae Park, H. Fujimoto, M. Shiraishi and M. Inagaki, Carbon 42, 701-714 (2004)) was used. The sample preparation was the same as for the c/2 determination described above.

[004]/[110] Ratio

The isotropicity of the crystallites is determined by the ratio of the intensity and/or by the ratio of the area between the [004] and the [110] XRD peaks. The intensity and the area of the peaks are determined after applying a peak fitting program using the PANalytical X'Pert HighScore Plus software. The samples are prepared as a slurry on a Mylar foil which is then dried. During the blading of the slurry on the foil, an alignment of flaky particles occurs. Through this blading procedure, a preferred orientation of anisotropic particles such as graphite is introduced.

If crystallites are arranged in an anisotropic fashion on the Mylar foil, the [004]/[110] ratio of the peak areas is very high (i.e. in a preferred orientation). By contrast, if crystallites are oriented randomly, the [004]/[110] ratio is low. Ratios are reported based on peak area and intensity.

Crystallite Size $L_a$ by Raman Spectroscopy

Raman analyses were performed using a LabRAM-ARAMIS Micro-Raman Spectrometer from HORIBA Scientific with a 632.8 nm HeNe LASER. The ratio $I_G/I_D$ is based on the ratio of peak amplitudes of band D and band G. These peaks are characteristic for carbon materials, measured at 1580 $cm^{-1}$ and 1350 $cm^{-1}$, respectively.

Crystallite size $L_a$ is calculated from Raman measurements using the equation $$L_a[nm]=C^*(I_G/I_D),$$

where the constant C has a value of 5.8 nm for lasers with a wavelength of 632.8 nm (A. C. Ferrari, *Solid State Comm.* 2007, 143, 47-57).

Particle Size Distribution by Laser Diffraction

The presence of particles within a coherent light beam causes diffraction. The dimensions of the diffraction pattern are correlated with the particle size. A parallel beam from a low-power laser is irradiated on a cell which contains the sample suspended in water. The beam leaving the cell is focused by an optical system. The distribution of the light energy in the focal plane of the system is then analyzed. The electrical signals provided by the optical detectors are transformed into the particle size distribution by means of a calculator. A small sample of graphite is mixed with a few drops of wetting agent and a small amount of water. The sample prepared in the described manner is introduced into the storage vessel of the apparatus and measured.

References: ISO 13320-1/ISO 14887

Xylene Density

The analysis is based on the principle of liquid exclusion as defined in DIN 51 901. Approx. 2.5 g (accuracy 0.1 mg) of powder is weighed in a 25 ml pycnometer. Xylene is added under vacuum (20 mbar). After a few hours dwell time under normal pressure, the pycnometer is conditioned and weighed. The density represents the ratio of mass and volume. The mass is given by the weight of the sample and the volume is calculated from the difference in weight of the xylene filled pycnometer with and without sample powder.
Reference: DIN 51 901

Scott Density (Apparent Density)

The Scott density is determined by passing the dry carbon powder through the Scott volumeter according to ASTM B 329-98 (2003). The powder is collected in a 1 in 3 vessel (corresponding to 16.39 cm$^3$) and weighed to 0.1 mg accuracy. The ratio of weight and volume corresponds to the Scott density. It is necessary to measure three times and calculate the average value. The bulk density of graphite is calculated from the weight of a 250 mL sample in a calibrated glass cylinder.
Reference: ASTM B 329-98 (2003)

Spring-Back

Spring-back is a source of information regarding the resilience of compacted graphite powders. A defined amount of powder is poured into a die. After inserting the punch and sealing the die, air is evacuated from the die. A compression force of about 1.5 tons/cm$^2$ is applied and the powder height is recorded. This height is recorded again after the pressure has been released. Spring-back is the height difference in percent relative to the height under pressure.

Mercury Intrusion Porosimetry

The method is based on the measurement of the amount of mercury intrusion versus the pressure applied to a sample immersed in mercury. On the basis of the applied pressure, the surface tension of mercury and the contact angle between mercury and the solid surface, the pore size can be calculated. The experiments were performed on a sample (ca. 0.1-0.3 g) over the pressure range of 0.5-4000 bar using a Micromeritics Autopore III machine. For treating the data, a contact angle of 130° and a surface tension of 485×10$^{-3}$ N/m were used. The porosity of a sample is determined from the following equation:

$$\text{Porosity} = \frac{\text{Specific pore volume}}{\text{Specific pore volume} + \frac{1}{\text{xylene density}}}$$

where the specific pore volume is determined as the volume of mercury intruded per gram of sample, including interparticle and intraparticle porosity. The volume of mercury which causes the initial settling of the sample due to the exerted pressure is not included.
Reference: ISO 15901-1:2005(E)

Thermogravimetric Analysis (TGA)

The determination of the percentage of mass loss of any pyrolyzed carbon is performed by using conventional thermogravimetric equipment (TGA). A sample of ca. 20-30 mg was used for the measurements. The atmosphere in the thermogravimetric equipment is pure oxygen with a flow rate of 10 mL/min (with initial purging of 30 mL/min) with a heating rate of 5° C./min up to 1000° C. followed by an isotherm of 2 hours. Pyrolyzed carbon can be distinguished from graphitic or non-graphitic carbon as it burns off at lower temperature.

Dynamic Image Analysis

The sphericity and the aspect-ratio of the particles of the material were obtained from an image analysis sensor, which is a combination of particle size and shape analysis. The experiments were performed using a Sympatec QICPIC sensor and a MIXCEL dispersing unit. The material was prepared as a paste with water and a surfactant (liquid detergent). The instrument uses a high speed camera (up to 500 fps) and a pulsed light source to capture clear rear-illuminated images of entrained particles. The measurement time varied between 30-60 seconds with an average of more than 500000 measured particles. Each sample was repeated three times for reproducibility measurements. The software program determines all of the parameters for the particles.

Sphericity

The sphericity, S, is the ratio of the perimeter of the equivalent circle (assuming the particles are circles with a diameter such that it has the same area of the projection area of the particle), $P_{EQPC}$, to the real perimeter, P real. The Q3 (S=0.8) value mentioned herein corresponds to the percentage of particles (by cumulative volume) which have a sphericity lower than S=0.8. Accordingly, a small percentage indicates a sample with highly spherical particles as the majority of the particles in the sample have a sphericity greater than 0.8.

Additionally, $k_{S,\rho}$ is a parameter expressing the ratio of the percentage $Q_3$ (S=0.8) versus the decrease in xylene density from the theoretical value for graphite (which is 2.26 g/cm$^3$):

$$k_{S,\rho} = Q_3(S=0.8)/(2.26 - \text{xylene density})$$

For non-graphitic (coke) particles coated with amorphous carbon, $k_{S,\rho}$ is a parameter expressing the ratio of the percentage $Q_3$ (S=0.8) versus the decrease in xylene density from the value observed for average uncoated coke particles (which is 2.1 g/cm$^3$):

$$k_{S,\rho} = Q_3(S=0.8)/(2.1 - \text{xylene density})$$

PAH Concentration

The concentration of polycyclic aromatic hydrocarbons PAH was determined by the Grimmer method and the analyses were performed externally by BIU-Grimmer (Germany). The Grimmer method generally used for PAH analysis is based on a stable isotope dilution methodology using GC-MS(SIM) for quantification in the sub ppb range.

Lithium-Ion Negative Electrode Half Cell Test Standard Procedure

This test was used to quantify the reversible and irreversible capacity of the surface-modified coated carbonaceous particles.

General Half-Cell Parameters:

2 Electrode coin cell design with Li metal foil as counter/reference electrode, cell assembly in an argon filled glove box (oxygen and water content<1 ppm).

Diameter of Electrodes:

13 mm

A calibrated spring (100 N) was used in order to have a defined force on the electrode. Tests were carried out at 25° C.

Dispersion Formulation:

97% graphite/coke, 1% CMC (Sodium-carboxymethylcellulose), 2% SBR (styrene-butadiene rubber)

Dispersion Preparation:

Add the carbon powder to the CMC solution (1.5% in water) and homogenize with a dissolver disk for 20 min at reduced pressure at 600 rpm. Add the SBR latex (46% in water) and further homogenize for 20 min.

Blading Height on Cu Foil:

200 μm (doctor blade).

Drying Procedure:

Coated Cu foils were dried for 1 h at 80° C., followed by 12 h at 120° C. under vacuum (<50 mbar). After cutting, the electrodes were dried for 10 h at 120° C. under vacuum (<50 mbar) before insertion into the glove box.

Pressing of Electrodes:

As indicated in Tables 3 and 4, electrodes were either measured without pressing, or were pressed to a density of 1.5-1.7 g/cm$^3$ using a hydraulic press.

Electrolyte:

Ethylenecarbonate (EC):Ethylmethylcarbonate (EMC) 1:3, 1 M LiPF$_6$ was used for all examples.

Separator:

Glass fiber sheet, ca. 1 mm.

Cycling Program Using a Potentiostat/Galvanostat:

1$^{st}$ charge: constant current step 20 mA/g to a potential of 5 mV vs. Li/Li$^+$, followed by a constant voltage step at 5 mV vs. Li/Li$^+$ until a cutoff current of 5 mA/g was reached.

1$^{st}$ discharge: constant current step 20 mA/g to a potential of 1.5 V vs. Li/Li$^+$, followed by a constant voltage step at 1.5 V vs. Li/Li$^+$ until a cutoff current of 5 mA/g was reached.

2$^{nd}$ charge: constant current step at 50 mA/g to a potential of 5 mV vs. Li/Li$^+$, followed by a constant voltage step at 5 mV vs. Li/Li$^+$ until a cutoff current of 5 mA/g was reached.

2$^{nd}$ discharge: constant current step at 3 C to a potential of 1.5 V vs. Li/Li$^+$, followed by constant voltage step at 1.5 V vs. Li/Li$^+$ until a cutoff current of 5 mA/g was reached.

Power Performance

2 C was applied to the fully charged cell to a potential of 1.5V vs. Li/Li$^+$. The power performance was defined as the obtained capacity divided by the reversible capacity of the 2$^{nd}$ cycle.

Having described the various aspects of the present disclosure in general terms, it will be apparent to those of skill in the art that many modifications and slight variations are possible without departing from the spirit and scope of the present disclosure.

Some of these embodiments will now also be described by way of illustration, with reference to the following examples.

EXAMPLES

Example 1

30 g of ammonium lignosulfonate were dissolved in 600 mL of deionized water while stirring vigorously with a dissolver disc. 200 g of coke precursor 1 (properties listed in Table 1 below) were slowly added, followed by further mixing for 2 h. This dispersion was spray-dried using a Büchi B-290 laboratory spray dryer, using a 2-fluid nozzle in co-current mode with an inlet temperature of 170° C. and an air gas flow rate of 700 L/h, resulting in a carbonaceous powder that was collected in the product collection vessel attached to the cyclone. In a glass tube carbonization oven, this powder was heated to 450° C. under a nitrogen atmosphere over the course of 1 h, followed by further treatment at 450° C. for 1 h. Heat treatment in an argon atmosphere (ramp up to 2,000° C.: 10° C./min, ramp from 2,000-3,000° C.: 5° C./min, followed by 4 h at 3,000° C.) resulted in carbon powder 4 (see Table 2).

Example 2

30 g of ammonium lignosulfonate were dissolved in 600 mL of deionized water while stirring vigorously with a dissolver disc. 200 g of coke precursor 2 (properties listed in Table 1 below) were slowly added, followed by further mixing for 2 h. This dispersion was spray-dried using a Büchi B-290 laboratory spray dryer, using a 2-fluid nozzle in co-current mode with an inlet temperature of 170° C. and an air gas flow rate of 700 L/h, resulting in a carbonaceous powder that was collected in the product collection vessel attached to the cyclone. In a glass tube carbonization oven, this powder was heated to 450° C. under a nitrogen atmosphere over the course of 1 h, followed by further treatment at 450° C. for 1 h. Heat treatment in an argon atmosphere (ramp up to 2,000° C.: 10° C./min, ramp from 2,000-3,000° C.: 5° C./min, followed by 4 h at 3,000° C.) resulted in carbon powder 6 (see Table 2). Alternatively, heat treatment after carbonization at 450° C. in an argon atmosphere (ramp up to 1,800° C.: 10° C./min, followed by 4 h at 1,800° C.) resulted in carbon intermediate 5 (see Table 2).

Example 3

30 g of ammonium lignosulfonate were dissolved in 600 mL of deionized water while stirring vigorously with a dissolver disc. 200 g of coke precursor 3 (properties listed in Table 1 below) were slowly added, followed by further mixing for 2 h. This dispersion was spray-dried using a Büchi B-290 laboratory spray dryer, using a 2-fluid nozzle in co-current mode with an inlet temperature of 170° C. and an air gas flow rate of 700 L/h, resulting in a carbonaceous powder that was collected in the product collection vessel attached to the cyclone. In a glass tube carbonization oven, this powder was heated to 450° C. under a nitrogen atmosphere over the course of 1 h, followed by further treatment at 450° C. for 1 h. Heat treatment in an argon atmosphere (ramp up to 2,000° C.: 10° C./min, ramp from 2,000-3,000° C.: 5° C./min, followed by 4 h at 3,000° C.) resulted in carbon powder 7 (see Table 2).

Example 4

300 g of ammonium lignosulfonate were dissolved in 6,000 mL of deionized water while stirring vigorously with a dissolver disc. 1,100 g of coke precursor 9 and 600 g of graphite precursor 10 (properties listed in Table 3 below) were slowly added, followed by further mixing for 2 h. This dispersion was spray-dried using a pilot scale spray dryer, using a 2-fluid nozzle in co-current mode with an inlet temperature of 220° C. and an air gas pressure of 3 bar, resulting in a carbonaceous powder that was collected in the product collection vessel attached to the cyclone. In a carbonization oven, this powder was heated to 450° C. under a nitrogen atmosphere over the course of 1 h, followed by further treatment at 450° C. for 1 h. Heat treatment in an argon atmosphere (ramp up to 2,000° C.: 10° C./min, ramp from 2,000-3,000° C.: 5° C./min, followed by 4 h at 3,000° C.) resulted in carbon powder 11. The physicochemical parameters of carbon powder 11 are shown in Table 4. In electrochemical tests, the carbon powder 11 was mixed with graphite active material 12 (a synthetic graphite with a hydrophilic coating, as described in WO 2016/008951) in a 3:7 weight ratio, and the mixture was used to prepare negative electrodes. The electrochemical data for the active graphite mixture 13 are reported in Table 4 and 5. As shown in FIGS. 5 and 6, the analysis by means of SEM of the cross-sections for these electrodes shows that the snow-ball morphology of the secondary graphite particles is essentially maintained even in the pressed electrode.

Comparative Example 5

Heat treatment of coke precursor 1 (properties listed in Table 1 below) in an argon atmosphere (ramp up to 2,000°

C.: 10° C./min, ramp from 2,000-3,000° C.: 5° C./min, followed by 4 h at 3,000° C.) resulted in carbon powder 8 (see Table 2).

Results

TABLE 2

Properties of Carbon Precursors

| | Coke precursor 1 | Coke precursor 2 | Coke precursor 3 |
|---|---|---|---|
| Particle size | | | |
| $D_{10}$ (µm) | 3.3 | 2.9 | 3.8 |
| $D_{50}$ (µm) | 7.8 | 6.9 | 9.0 |
| $D_{90}$ (µm) | 15.0 | 13.2 | 16.2 |
| BET SSA ($m^2/g$) | 4.7 | 13.3 | 19 |
| Xylene density ($g/cm^3$) | 2.13 | 2.077 | 1.534 |
| Scott density ($g/cm^3$) | 0.22 | 0.26 | 0.44 |
| Interlayer distance c/2 (nm) | 0.3486 | 0.3490 | 0.3561 |
| Crystallite size $L_c$ (nm) | 4 | 2.9 | 2 |

TABLE 3

Properties of Carbonaceous Composite Particles

| | Carbon powder 4 | Carbon intermediate 5 | Carbon powder 6 | Carbon powder 7 | Carbon powder 8 (comparative example) |
|---|---|---|---|---|---|
| Particle size | | | | | |
| $D_{10}$ (µm) | 7.5 | 7.6 | 6.7 | n.d. | 2.9 |
| $D_{50}$ (µm) | 14.9 | 15.6 | 14.1 | | 7.5 |
| $D_{90}$ (µm) | 25.9 | 29.0 | 26.0 | | 14.1 |
| BET SSA ($m^2/g$) | 1.7 | 2.1 | 1.9 | n.d. | 2.9 |
| BET SSA ($m^2/g$) after pressing at 15 kN/cm² | 2.4 | 3.1 | 2.7 | n.d. | n.d. |
| Xylene density ($g/cm^3$) | 2.254 | 2.161 | 2.251 | 2.029 | 2.256 |
| Scott density ($g/cm^3$) | 0.30 | n.d. | 0.35 | n.d. | 0.19 |
| Interlayer distance c/2 (nm) | 0.3363 | 0.3482 | 0.3364 | 0.3438 | 0.3362 |
| Crystallite size $L_c$ (nm) | 108 | 10 | 86 | 10 | 132 |
| Crystallite size $L_a$ (nm) | 58 | 4 | n.d. | n.d. | n.d. |
| [004]/[110] (intensity) | 2.08 | n.d. | 1.59 | n.d. | 147 |
| [004]/[110] (area) | 3.36 | n.d. | 2.26 | n.d. | 180 |
| Mass loss of pyrolyzed carbon (TGA) [%] | 0.2 | n.d. | 0.2 | 0.3 | n.d. |
| Reversible capacity 2nd cycle (mAh/g), unpressed electrodes | 324 | n.d. | n.d. | 181 | n.d. |
| Irreversible capacity 1st cycle [%], unpressed electrodes | 6.3 | n.d. | n.d. | 18.2 | n.d. |

TABLE 4

Properties of Carbonaceous Composite Particles based on a Coke/Graphite Precursor Mixture

| | Coke precursor 9 | Graphite precursor 10 | Carbon powder 11 | Graphite Active Material 12 | Active Material 13 (mixture of carbon powder 11 and material 12 @ weight ratio 3:7) |
|---|---|---|---|---|---|
| Particle size | | | | | n.d. |
| $D_{10}$ (µm) | 1.4 | 2.4 | 5.6 | 7.4 | |
| $D_{50}$ (µm) | 7.3 | 6.0 | 15.5 | 17.2 | |
| $D_{90}$ (µm) | 19.7 | 12.3 | 33.3 | 34.9 | |
| BET SSA ($m^2/g$) | 19.2 | 15.2 | 2.1 | 3.4 | n.d. |
| BET SSA ($m^2/g$) after pressing at 15 kN/cm² | n.d. | n.d. | 2.8 | n.d. | n.d. |
| Xylene density ($g/cm^3$) | 2.052 | 2.25 | 2.22 | 2.217 | n.d. |
| Interlayer distance c/2 (nm) | 0.3493 | 0.3358 | 0.3365 | 0.3357 | n.d. |
| Crystallite size $L_c$ (nm) | 3 | 99 | 72 | 147 | n.d. |
| Reversible capacity 1st cycle (mAh/g) | n.d. | n.d. | 325 | 358 | 347 |
| Irreversible capacity 1st cycle [%] | n.d. | n.d. | 7.9 | 8.2 | 8.3 |
| Hg-porosimetry | n.d. | n.d. | 69.2 | n.d. | n.d. |

Several materials were also examined in terms of their electrochemical properties, in particular regarding their specific charge and coulombic efficiency. Specific charge obtained in the first electrochemical lithium insertion and subsequent de-insertion cycle, the coulombic efficiency of the first insertion/de-insertion cycle, the direct current resistance (DCR) and the high rate performance of the electrode at 2 C (specific charge of the half-cell obtained by a complete discharge in 30 minutes) normalized to the specific charge at 0.2 C (5 h discharge).

TABLE 5

Electrochemical Parameters

|  | Spherical coated natural graphite (reference material) | Carbon powder 11 | Graphite Active Material 12 | Active Material 13 (mixture of carbon powder 11 and material 12 @ weight ratio 3:7) |
|---|---|---|---|---|
| Specific charge 1$^{st}$ lithium insertion in mAh/g | 392.0 | 353.1 | 389.7 | 377.7 |
| Specific charge 1$^{st}$ lithium de-insertion in mAh/g | 359.8 | 325.0 | 357.6 | 346.5 |
| Coulombic efficiency (1$^{st}$ charge/discharge cycle) in % | 91.8 | 92.2 | 91.8 | 91.7 |
| DCR in Ohm | 19.5 | 24.2 | 23.8 | 26.3 |
| Specific charge retention (rate capability) at 2 C/0.2 C in % | 98.2 | 99.9 | 97.5 | 99.0 |

Additionally, the pore volume distribution was determined by mercury porosimetry for several carbonaceous materials (a synthetic graphite, a spherical natural graphite and carbon powder 11), see also FIG. 8 for a graphical representation of the results.

TABLE 6

Pore Volume Distribution by Mercury Porosimetry

|  | >10 μm | 5-10 μm | 1-5 μm | 0.1-1 μm |
|---|---|---|---|---|
| Synthetic Graphite | 0.3 | 0 | 0.7 | 0 |
| Spherical Natural Graphite | <0.1 | 0 | 0.3 | 0.1 |
| Graphite Powder 11 | 0.2 | 0 | 0.8 | 0 |

The invention claimed is:

1. Carbonaceous composite particles, characterized in that said particles are comprised of a multiplicity of aggregated primary particles, wherein 22% or more of the primary particles have a sphericity of at least 0.8, as determined by dynamic imaging;
   further wherein said primary particles are held together by a carbonaceous binder material attached to the surface of the primary particles; and
   the composite particles are graphitic composite particles characterized by an interlayer distance c/2 of 0.337 nm or less.

2. The carbonaceous composite particles according to claim 1, wherein said composite particles are further characterized by a pressure stability wherein the BET specific surface area (SSA) does not increase by more than 3.5 m2/g, and/or by more than 80% after pressing the composite particles at 15 kN/cm2 for 10 s, compared to the BET SSA before pressing.

3. The carbonaceous composite particles according to claim 1, wherein said composite particles are further characterized by a mass loss of non-graphitic carbon according to thermogravimetric analysis of less than 5%.

4. The carbonaceous composite particles according to claim 1, wherein said composite particles are further characterized by having a crystalline surface with a surface crystallinity expressed by an La of >4 nm, as determined by measuring the ID/IG band amplitude ratio via Raman spectroscopy.

5. The carbonaceous composite particles according to claim 1, characterized by a near-random or random orientation of the primary particles in the aggregated composite particle.

6. The carbonaceous composite particles according to claim 1, being isotropic in their electrical, mechanical, and/or heat-conductive properties.

7. The carbonaceous composite particles according to claim 1, wherein the carbonaceous composite particles are further characterized by a ratio of peak areas of [004] and [110] reflections of lower than 10.

8. The carbonaceous composite particles according to claim 1, wherein the carbonaceous composite particles are further characterized by
   i) a BET specific surface area (BET SSA) of between 0.3 and 20 $m^2/g$;
   ii) a crystallite size Lc of less than 300 nm;
   iii) by a xylene density of at least 2.00, or at least 2.10, or at least 2.20 $g/cm^3$;
   iv) an Lc/La ratio of at least 1, or at least 2 or at least 3; and/or
   v) a spring-back of between 10 and 90%; and/or
   vi) the carbonaceous binder material connecting said primary particles being graphitic, or non-graphitic carbon, or both.

9. The carbonaceous composite particles according to claim 1, wherein the primary particles are selected from carbonaceous materials.

10. The carbonaceous composite particles according to claim 1, wherein the primary particles are selected from a single material.

11. The carbonaceous composite particles according to claim 1, wherein the carbonaceous binder material is of only one type for all primary particles in the composite particle.

12. The carbonaceous composite particles according to claim 1, wherein the carbonaceous binder material attached to the surface of said primary particles is graphitic carbon.

13. The carbonaceous composite particles according to claim 1, wherein the carbonaceous binder material attached to the surface of said primary particles is non-graphitic carbon.

14. The carbonaceous composite particles according to claim 1, wherein an average length of a major axis of the primary particles as observed by scanning electron microscopy (SEM) is between 1 and 15 μm.

15. The carbonaceous composite particles according to claim 1, wherein the carbonaceous binder material is of multiple types for at least a portion of the primary particles in the composite particle.

16. The carbonaceous composite particles according to claim 15, wherein the multiple carbonaceous binder materials are obtained by different coating methods and/or by employing different carbon precursors.

17. The carbonaceous composite particles according to claim 1, further characterized by having one or more of:
   a particle size distribution (PSD) of the composite particles having a D90 value ranging from 5 to 70 μm, and/or a D50 value ranging from 2 to 30 μm, and/or a D10 value ranging from 0.5 to 20 μm;
   a polycyclic aromatic hydrocarbon (PAH) concentration of less than 200 mg/kg; and
   a rate capability 2 C/0.2 C of at least 97% when present as an active material in a negative electrode of a Lithium-ion battery.

18. The carbonaceous composite particles according to claim 1, further comprising an additive selected from the group consisting of carbon black, colloidal graphite, graphene, graphene nanoplatelets, graphene or carbon fibers, fullerenes, nanographite, char, carbon nanotubes (CNT), including single-walled nanotubes (SWNT), multiwalled nanotubes (MWNT), or mixtures of any of the foregoing, metals/metalloids.

19. Carbonaceous composite particles, characterized in that said particles are comprised of a multiplicity of aggregated primary particles,
   wherein 22% or more of the primary particles have a sphericity of at least 0.8, as determined by dynamic imaging;
   further wherein said primary particles are held together by a carbonaceous binder material attached to the surface of the primary particles; and
   the composite particles are non-graphitic composite particles characterized by an interlayer distance c/2 of at least 0.338 nm.

20. Carbonaceous composite particles, characterized in that said particles are comprised of a multiplicity of aggregated primary particles, wherein 22% or more of the primary particles have a sphericity of at least 0.8, as determined by dynamic imaging;
   further wherein said primary particles are held together by a carbonaceous binder material attached to the surface of the primary particles; and
   the carbonaceous composite particles are further characterized by a non-graphitic carbon coating on the surface of the composite particles.

* * * * *